(12) United States Patent
Nardini et al.

(10) Patent No.: US 12,444,843 B2
(45) Date of Patent: Oct. 14, 2025

(54) ANTENNA AND ANTENNA SYSTEMS FOR LEO SATELLITE COMMUNICATION

(71) Applicant: Fleet Space Technologies Pty Ltd, Beverley (AU)

(72) Inventors: Flavia Tata Nardini, Semaphore Park (AU); Matthew James Pearson, Henley Beach (AU); Yan Brand, Quebec (CA); Zahra Esmati, Beverley (AU); Nicollas Alexandre, Beverley (AU)

(73) Assignee: Fleet Space Technologies Pty Ltd, South (AU)

( * ) Notice: Subject to any disclaimer, the term of this patent is extended or adjusted under 35 U.S.C. 154(b) by 88 days.

(21) Appl. No.: 17/997,722

(22) PCT Filed: Apr. 30, 2021

(86) PCT No.: PCT/AU2021/050399
§ 371 (c)(1),
(2) Date: Nov. 1, 2022

(87) PCT Pub. No.: WO2021/217219
PCT Pub. Date: Nov. 4, 2021

(65) Prior Publication Data
US 2023/0178896 A1 Jun. 8, 2023

(30) Foreign Application Priority Data

May 1, 2020 (AU) .............................. 2020901388
Jan. 15, 2021 (AU) .............................. 2021900079

(51) Int. Cl.
*H01Q 9/04* (2006.01)
*H01Q 1/28* (2006.01)
(Continued)

(52) U.S. Cl.
CPC ............ *H01Q 9/0414* (2013.01); *H01Q 1/288* (2013.01); *H01Q 3/2617* (2013.01); *H01Q 3/34* (2013.01);
(Continued)

(58) Field of Classification Search
CPC ........ H01Q 1/288; H01Q 3/26; H01Q 3/2617; H01Q 3/267; H01Q 3/34; H01Q 5/30;
(Continued)

(56) References Cited

U.S. PATENT DOCUMENTS 6,002,360 A  12/1999 Wolcott et al.
7,030,824 B1 * 4/2006 Taft .......................... H01Q 3/46
                                                            342/368

(Continued)

FOREIGN PATENT DOCUMENTS

CN    104885104 A    9/2015
CN    108123734 A    6/2018
(Continued)

OTHER PUBLICATIONS

International Search Report and Written Opinion issued in International Application No. PCT/AU2021/050399, mailed on Jun. 25, 2021.

(Continued)

*Primary Examiner* — Hoang V Nguyen
(74) *Attorney, Agent, or Firm* — Knobbe, Martens, Olson & Bear, LLP

(57) ABSTRACT

Antennas suitable for deployment as part of a satellite, such as a low earth orbit (LEO) satellite. Some embodiments relate to antenna arrays for LEO satellites. An antenna, including a base; a first antenna patch body; and a second antenna patch body disposed substantially parallel to and spaced from the first antenna patch body; wherein the first and second antenna patch bodies are aligned along a central (Continued)

axis and coupled to the base; and wherein each of the first and second antenna patch bodies define surface corrugations.

55 Claims, 15 Drawing Sheets

(51) Int. Cl.
*H01Q 3/26* (2006.01)
*H01Q 3/34* (2006.01)
*H04B 7/06* (2006.01)
*H04B 7/185* (2006.01)
*H04B 7/195* (2006.01)
*H04B 7/204* (2006.01)

(52) U.S. Cl.
CPC ......... *H01Q 9/0442* (2013.01); *H01Q 9/0471* (2013.01); *H04B 7/0617* (2013.01); *H04B 7/1851* (2013.01); *H04B 7/195* (2013.01); *H04B 7/2041* (2013.01)

(58) Field of Classification Search
CPC .. H01Q 9/0407; H01Q 9/0414; H01Q 3/0442; H01Q 3/0471; H01Q 21/065; H01Q 21/08; H01Q 25/02
See application file for complete search history.

(56) References Cited

U.S. PATENT DOCUMENTS

| | | |
|---|---|---|
| 7,126,553 B1 | 10/2006 | Fink et al. |
| 7,750,863 B2 | 7/2010 | Wesel |
| 8,005,034 B2 | 8/2011 | Dankberg et al. |
| 8,315,199 B2 | 11/2012 | Dankberg et al. |
| 9,848,370 B1 | 12/2017 | Freedman et al. |
| 9,966,658 B2 | 5/2018 | Fitz-Coy et al. |
| 10,069,553 B2 | 9/2018 | Chang et al. |
| 10,555,236 B1 | 2/2020 | Freedman et al. |
| 10,892,816 B1 | 1/2021 | Struhsaker et al. |
| 11,152,987 B1 | 10/2021 | Deshpande |
| 11,211,967 B2 | 12/2021 | Turkowski et al. |
| 2001/0055948 A1 | 12/2001 | Ikeda et al. |
| 2003/0189516 A1* | 10/2003 | Olson ................ H01Q 9/0414 343/700 MS |
| 2004/0157554 A1 | 8/2004 | Wesel |
| 2004/0246181 A1 | 12/2004 | Fukushima et al. |
| 2008/0143636 A1 | 6/2008 | Couchman et al. |
| 2009/0081946 A1 | 3/2009 | Dankberg et al. |
| 2013/0234883 A1 | 9/2013 | Ma et al. |
| 2014/0039963 A1 | 2/2014 | Augenstein et al. |
| 2014/0218255 A1 | 8/2014 | Sanford et al. |
| 2015/0162656 A1 | 6/2015 | Fitz-Coy et al. |
| 2016/0043800 A1 | 2/2016 | Kingsbury et al. |
| 2016/0104942 A1* | 4/2016 | Pera .................... H01Q 1/246 343/836 |
| 2017/0021948 A1 | 1/2017 | Yehezkel |
| 2017/0229754 A1* | 8/2017 | Lee .................... H01Q 21/065 |
| 2017/0230104 A1 | 8/2017 | Purkayastha et al. |
| 2017/0279202 A1 | 9/2017 | Galla et al. |
| 2018/0034536 A1 | 2/2018 | Trutna et al. |
| 2018/0048371 A1 | 2/2018 | Chang et al. |
| 2018/0227043 A1 | 8/2018 | Dankberg |
| 2018/0278323 A1 | 9/2018 | Trutna et al. |
| 2018/0358701 A1 | 12/2018 | Gimersky |
| 2019/0372207 A1 | 12/2019 | Hardman et al. |
| 2021/0249788 A1 | 8/2021 | Saitto |
| 2023/0179286 A1 | 6/2023 | Nardini et al. |

FOREIGN PATENT DOCUMENTS

| | | | |
|---|---|---|---|
| CN | 108011190 B | 2/2020 | |
| DE | 102012023938 | 6/2014 | |
| EP | 4143923 A1 | 3/2023 | |
| JP | 2015154368 A * | 8/2015 | ............ H01Q 13/08 |
| KR | 20190044023 A * | 4/2019 | ............ H01Q 9/04 |
| WO | WO-9900867 A1 * | 1/1999 | ............ H01Q 1/38 |
| WO | WO-2014084655 A1 * | 6/2014 | ............ H01Q 1/241 |
| WO | WO 2014/121197 | 8/2014 | |
| WO | WO-2018010817 A1 * | 1/2018 | ............ H01Q 1/246 |
| WO | WO 2021/217215 A1 | 11/2021 | |
| WO | WO 2021/217219 A1 | 11/2021 | |

OTHER PUBLICATIONS

International Search Report and Written Opinion issued in International Application No. PCT/AU2021/050395, mailed on Jun. 21, 2021.
Extended European Search Report issued in EP Application No. 21797191.0, dated Apr. 23, 2024.
Ghazali et al., "Affordable 3D Printed Microwave Antennas", IEEE Electronic Components & Technology Conference, 2015, pp. 240-246.
International Search Report issued in International Application No. PCT/AU2022/051310, mailed on Dec. 23, 2022.
Office Action issued in Chinese Application No. 202180046687.0, dated Mar. 28, 2024.
Search Report issued in Chinese Application No. 202180046687.0, dated Mar. 21, 2024.
Yang et al., "Research on low-orbit satellite communications and Internet of Things applications", Chinese Journal on Internet of Things, Dec. 2019, 3(4): 101-108.
Abdullah et al., "An Improved S-Band CubeSat Communication Subsystem Design and Implementation", IEEE Access, 2021, 9: pp. 45123-45136.
Abulgasem et al., "Antenna Designs for CubeSats: A Review", IEEE Access, 2021, 9: 45289-45324.
Akyildiz et al., "A new CubeSat design with reconfigurable multi-band radios for dynamic spectrum satellite communication networks", Ad Hoc Networks, 2019, 86: 166-178.
Awais et al., "Design of a Compact High Isolation 4-Element Wideband Patch Antenna Array for GNSS Applications", IEEE Access, 2022, 10: pp. 13780-13786.
Davoli et al., "Small satellites and CubeSats: Survey of structures, architectures, and protocols", Int. J. Satell. Commun. Network, 2019, 37: 343-359.
Examination Report issued in AU Application No. 2021265158, dated Nov. 7, 2024.
Extended European Search Report issued in EP Application No. 21795676.2, dated Jun. 25, 2024.
Hashim et al., "Adaptive X-Band Satellite Antenna for Internet-of-Things (IoT) over Satellite Applications," 2019 13th International Conference on Signal Processing and Communication Systems (ICSPCS), IEEE, 2020, in 7 pages.
International-Type Search Report issued in AU Application No. 2020901388, dated Jul. 7, 2020.
International Search Report and Written Opinion issued in International Application No. PCT/AU2022/050510, mailed on Jun. 30, 2022.
Mars insight launch press kit, p. 13, May 2018.
Veljovic et al., "Patch Antenna System for CubeSats in L band", 2019 13th European Conference on Antennas and Propagation (EuCAP), IEEE, 2019, in 5 pages.

* cited by examiner

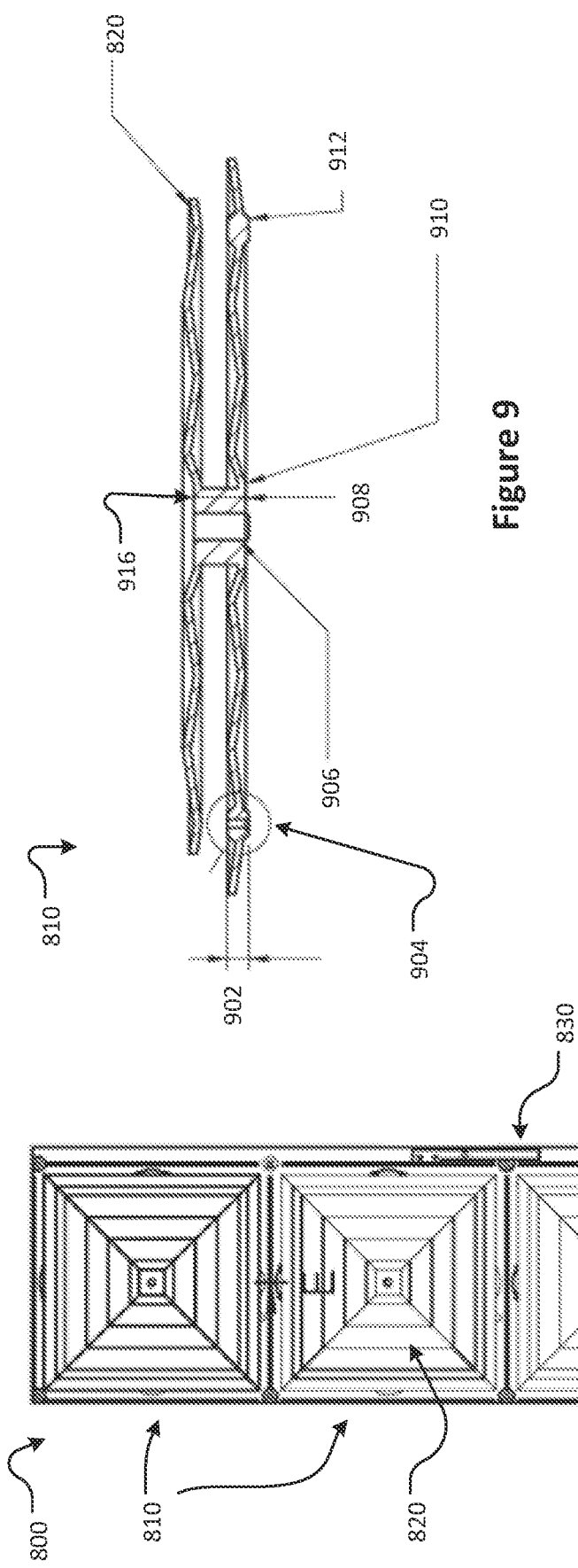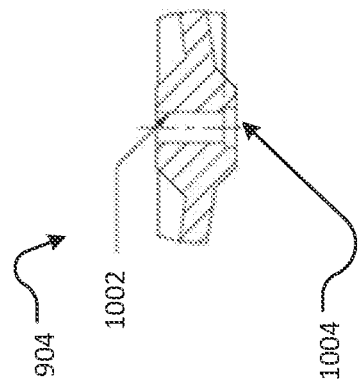

ANTENNA AND ANTENNA SYSTEMS FOR LEO SATELLITE COMMUNICATION

CROSS-REFERENCE TO RELATED APPLICATIONS

The present application claims priority from Australian Provisional Patent Application No 2020901388 filed on 1 May 2020, and Australian Provisional Patent Application No 2021900079 filed on 15 Jan. 2021, the contents of each of which are incorporated herein by reference in their entirety.

TECHNICAL FIELD

Embodiments relate to antennas. In particular, embodiments relate to antennas suitable for deployment as part of a satellite, such as a low earth orbit (LEO) satellite. Some embodiments relate to antenna arrays for LEO satellites.

BACKGROUND

Antennas intended for use in satellites are subject to significant physical constraints. The physical constraints relate to limited space available in satellites for incorporation of the antennas, and practical or cost limits on satellite mass. The constraints may be further amplified with the use of micro or nanosatellites, which are smaller in size and need to be as lightweight as possible. Despite the physical constraints, modern communication systems require greater efficiency in communication, low power consumption, improved scan performance and operation over larger frequency bandwidths.

It is desired to address or ameliorate one or more shortcomings or disadvantages of prior antennas or antenna systems, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to an antenna, comprising:
a base;
a first antenna patch body; and
a second antenna patch body disposed substantially parallel to and spaced from the first antenna patch body;
wherein the first and second antenna patch bodies are aligned along a central axis and coupled to the base; and
wherein each of the first and second antenna patch bodies define surface corrugations.

The first antenna patch body and the second antenna patch body of some embodiments may be held in spaced relation by a central post coupled to the base. In some embodiments, the first and second antenna patch bodies may be coupled to the base by the central post. In some embodiments, the central post may be integrally formed with one or both of the first and second antenna patch bodies.

The antenna of some embodiments may be formed in a stacked patch configuration.

The base of some embodiments forms a substantially square cup surrounding the first and second antenna patch bodies other than an upper side, the cup including first, second, third and fourth side walls projecting from the base toward the upper side.

The first antenna patch body of some embodiments may be positioned closer to the base and has a larger lateral length than the second antenna patch body.

The first and second antenna patch bodies of some embodiments may include a central region without corrugations.

In some embodiments, the first antenna patch body may have two probe coupling portions disposed at spaced locations toward an outer lateral edge of the first antenna body.

In some embodiments, the first and second antenna patch bodies have a substantially same thickness in areas outward of where the first and second antenna patch bodies couple to the base and other than at the two probe coupling portions. The surface corrugations of some embodiments may be formed at a shallow angle.

The surface corrugations of the first antenna patch body may be are aligned with the surface corrugations of the second antenna patch body so that separation of the first and second antenna patch bodies is substantially constant in a direction parallel to the central axis.

The first and second antenna patch bodies of some embodiment may be integrally formed as part of a unitary body. The unitary body of some embodiments may include a central coupling portion aligned with the central axis. In some embodiments, the unitary body may be formed by 3D printing. The first and second antenna patch bodies of some embodiments may be formed of aluminium or an aluminium alloy.

The antenna of some embodiments may have a lateral length and width of about 5 to 30 mm and a depth of about 1 to 5 mm.

Some embodiments relate to a patch antenna array, comprising multiple ones of the antennas positioned adjacently. In some embodiments, the multiple ones of the antenna are arranged to form an array. In some embodiments, spacing between the first antenna patch body of adjacent antennas may be substantially uniform. The adjacent antennas of some embodiments may share a cup wall. In some embodiments, the patch antenna array may have a unitary base that may act as the base of each antenna.

In some embodiments, the patch antenna array may further comprise a tuning element mounted adjacent to the patch antenna array for allowing calibration of each antenna.

In some embodiments, the base of each antenna defines first and second probe accommodation portions to receive respective first and second probes, the first and second probes being coupled to the first patch antenna body, wherein the first and second probe accommodation portions are spaced 90° apart relative to the central axis. The base of each antenna of some embodiments may define first and second RF balancing portions on opposite sides of the base from respective first and second probe accommodation portions.

Some embodiments relate to an antenna patch body for a stacked patch antenna, the antenna body may be formed as a unitary body including a first antenna patch body, a second antenna patch body and a central portion joining the first antenna patch body to the second antenna patch body, wherein the first and second antenna patch bodies may be substantially parallel with each other and spaced from each other. In some embodiments, the unitary body may be formed by 3D printing. In some embodiments, the unitary body may be formed of Aluminium or an Aluminium alloy. In some embodiments, the central portion may define a bore to allow coupling of the antenna patch body to an antenna base.

In some embodiments, the central portion may include a converging wall portion that may converge inwardly toward an axial middle location between the first and second antenna patch bodies. The converging wall portion may be disposed on one side of the central portion. The central portion of some embodiment may have a rectangular cross-sectional profile through a middle of the converging wall portion. In some embodiments, the rectangular cross-sectional profile may be angularly offset from a parallel cross-sectional profile of the first or second antenna patch body. The central portion may have a non-rectangular cross-sectional profile through a part of the converging wall portion that is spaced from the middle.

Some embodiments relate to an antenna comprising: a base; and the antenna patch body of coupled to the base via the central portion.

Some embodiments relate to an antenna, comprising:
a base;
a first antenna patch body;
a second antenna patch body disposed substantially parallel to and spaced from the first antenna patch body; and
first, second, third and fourth straight walls projecting from the base on respective four sides of the first and second antenna patch bodies;
wherein the first and second antenna patch bodies are aligned along a central axis and coupled to the base; and
wherein the first and second antenna patch bodies have a rectangular profile when viewed in a direction of the central axis.

In some embodiments, the first antenna patch body may be positioned closer to the base and may have a larger lateral length than the second antenna patch body.

In some embodiments, an air gap may separate the first and second antenna patch bodies at locations radially outward of the central portion. In some embodiments, the air gap may separate the first and second antenna bodies by a substantially fixed distance in a direction parallel to the central axis.

Some embodiments relate to a LEO satellite having mounted thereon: at least one antenna or a patch antenna array.

Some embodiments relate to a method for forming an antenna patch body, including transmitting to a 3D printer a print model executable by the 3D printer to print the antenna patch body.

Some embodiments relate to a method of assembling an LEO satellite, including installing on an outer face of a chassis of the LEO satellite: an antenna array or multiple ones of the antenna according to the embodiments.

BRIEF DESCRIPTION OF DRAWINGS

FIG. 8 is a plan view of an antenna array according to some embodiments;

FIG. 9 is a side cross-sectional view of an antenna element according to some embodiments;

FIG. 10 is a magnified side cross-sectional view of a probe coupling region of an antenna element shown in FIG. 9 according to some embodiments;

DETAILED DESCRIPTION OF EMBODIMENTS

Embodiments relate generally to antennas. Some embodiments relate to features of a single antenna. In particular, embodiments relate to antennas suitable for deployment as part of a satellite, such as a low earth orbit (LEO) satellite. Some embodiments relate to antenna arrays for LEO satellites and some embodiments relate to LEO satellites that include such antenna arrays. For context, an example LEO satellite system including an example antenna array is shown and described in relation to FIG. 1.

Figure 1:
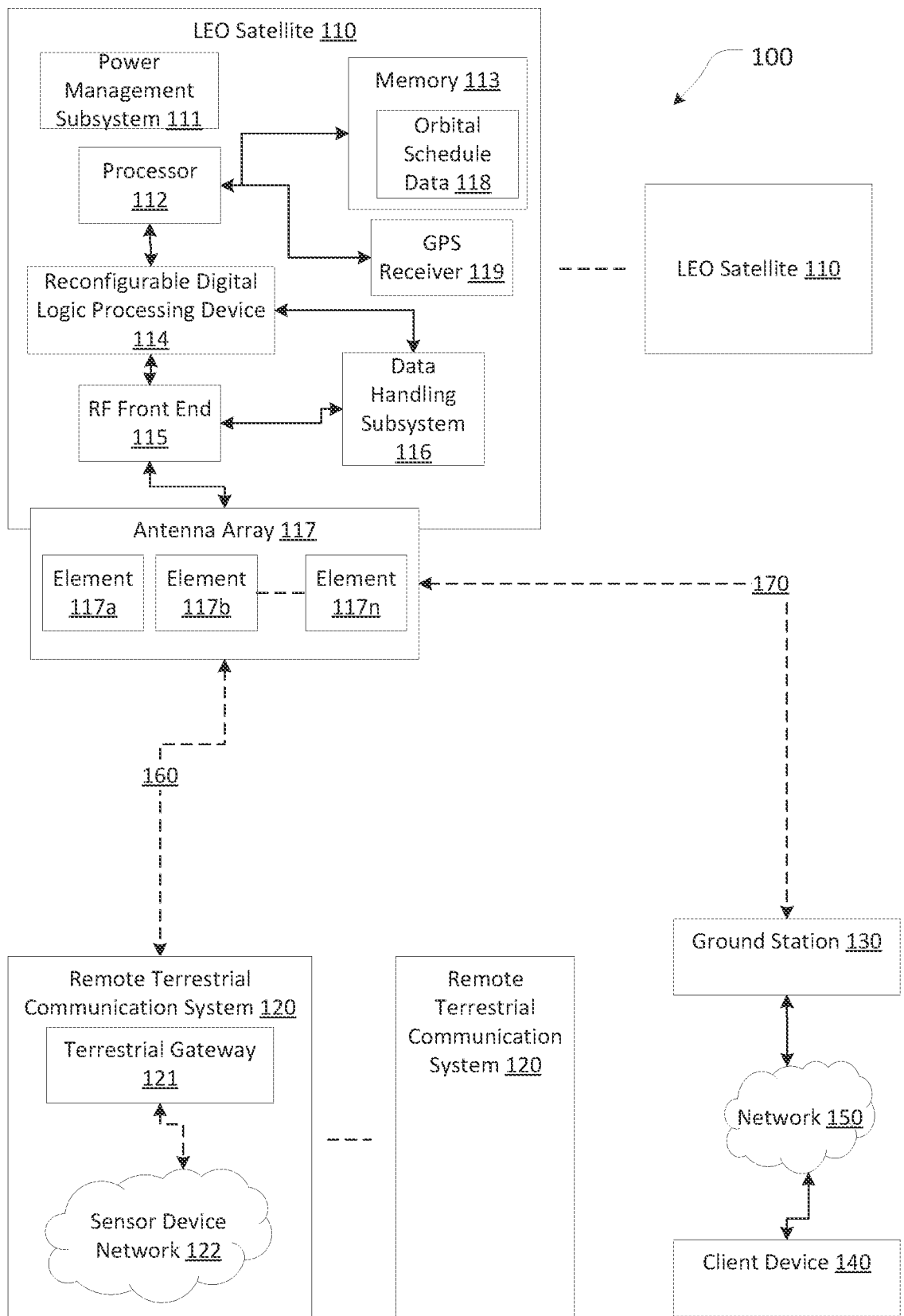
FIG. 1 is a block diagram of an LEO satellite communication system, according to some embodiments.

FIG. 1 is a block diagram of an LEO satellite communication system 100 according to some embodiments. The LEO communication system 100 comprises both terrestrial and satellite components that are configured to communicate with each other to provide a communication service. The LEO communication system 100 comprises one or more LEO Satellites 110; one or more remote terrestrial communication systems 120, and at least one ground station 130 in communication with a network 150 through which a client device 140 may interact with the communication system 100. One goal of the communication system 100 is to make the data gathered by the remote terrestrial communication system 120 readily available (although at high latency) to the client device 140 while dealing with the communication constraints of conveying information from remote locations through the LEO satellite 110 to the client device 140.

The remote terrestrial communication system 120 comprises a sensor device network 122 that may be configured to wirelessly communicate with a terrestrial gateway 121, for example. The sensor device network 122 may comprise several or many sensor devices located in a remote area where conventional communication networks, such as the internet or cellular networks, may not be available, for example. Such remote areas may include mines, remote agricultural land, remote scientific research stations, for example. The sensor devices may be configured to sense various environmental conditions, the status of machinery or may be used to track the movement of cattle, for example. The sensor devices network 122 may extend over an area of approximately 700 km$^2$, for example. The terrestrial gateway device 121 receives and stores information transmitted by the sensor devices of the sensor device network 122. The terrestrial gateway device 121 also serves as an information relay device between devices in the sensor device network 122 and the LEO satellite 110.

The LEO Satellite 110 comprises a communication system comprising an antenna array 117, a radio frequency front end 115, a digital logic processing device 114, a processor 112, a memory 113 in communication with the processor 112, and a data handling subsystem 116. The LEO satellite 110 also comprises a power management subsystem 111.

The antenna array 117 comprises two or more antenna elements, each antenna element being an independent antenna capable of receiving or transmitting or both receiving and transmitting radio waves or signals. The multiple antenna elements enable the spatial filtering or beamforming capabilities of the communication system of the LEO satellite 110.

The LEO satellite 110 also comprises a radio frequency front end 115 that performs pre-processing of signals received by the antenna array 117 or processing of signals provided to the antenna array 117 for transmission. The processing may comprise conversion of analogue signals to digital signals or vice versa, channelization of signals, and selection or rejection of particular frequency bands of signals, for example.

The reconfigurable digital logic processing device 114 comprises a matrix of configurable logic blocks (CLBs) connected via programmable interconnects. The reconfigurable digital logic processing device 114 may be dynamically reprogrammed to provide desired application or functionality required to provide a communication service through the communication system 100. The CLBs may be reconfigured to implement various digital logic processing capabilities. The CLBs may be configured to operate in cooperation with each other by appropriately programming the interconnects to implement complex logical operations. Advantageously, the reconfigurable digital logic processing device 114 may be reconfigured dynamically to account for changes in the location of the LEO satellite during orbit and consequential changes in the need for spatial filtering to be performed by the communication system of the LEO satellite. In some embodiments, the reconfigurable digital logic processing device 114 may be or include a field-programmable gate array (FPGA).

The LEO satellite 110 also comprises at least one processor 112 that is in communication with a memory 113 and the reconfigurable digital logic processing device 114. The processor 112 has the capability to reconfigure the reconfigurable digital logic processing device 114 according to instructions and data stored in memory 113. In some embodiments, the LEO satellite 110 may receive commands or instructions from ground station 130 over link 170. The commands may include instructions to reconfigure the reconfigurable digital logic processing device 114 to meet changing communication requirements between the LEO satellite 110 and one or more remote terrestrial communication systems 120. The capability to reconfigure the reconfigurable digital logic processing device 114 while the LEO satellite 110 is in orbit provides significant flexibility in providing a satellite communication service using described embodiments.

Memory 113 comprises orbital schedule data 118 relating to the LEO satellite 110. Orbital schedule data 118 includes data relating to the scheduled position of the LEO satellite 110 over time with respect to the earth and the various remote terrestrial communication systems 120 as the LEO satellite 110 traverses its orbit. The orbital schedule data 118 also comprises antenna array configuration records that reference an ephemeris record (stored in memory 113) indicating a scheduled position of the LEO satellite 110 in orbit over a period of time, together with array factor coefficients or weights associated with each antenna element defined in relation to the ephemeris record. The array factor coefficients or weights associated with each antenna element (at a particular time) define the mathematical operations to be performed by the reconfigurable digital logic processing device 114 to process the signals received by each antenna element or process signals provided to each antenna element for transmission. The array factor coefficients or weights are complex numbers comprising a real coefficient and an imaginary coefficient. Mathematical operations may be performed by the reconfigurable digital logic processing device 114 using the array factor coefficients or weights stored in the memory 113.

The at least one processor 112 is configured to execute software program code stored in memory 113 to periodically check the current scheduled orbital position and/or the actual determined orbital position of the LEO satellite 110 and then access the orbital schedule data associated with the current (determined) orbital position to determine the array factor coefficients to be provided to the reconfigurable digital logic processing device 114 for signal transmission and/or reception over a next (succeeding) time period. The resetting of the array factor coefficients (and thus redirection of digitally formed beams or nulled beams) can happen frequently according to the ephemeris data corresponding to the determined position of the LEO satellite 110. This means that, during a pass of the LEO satellite 110 over a particular terrestrial area, the array factor coefficients can be reset multiple times in a pass-over period (e.g. 200-250 seconds, optionally around 240 seconds) while the LEO satellite is in range of that particular area. Resetting the array factor coefficients multiple times in a pass-over period for a particular area causes the one or multiple formed or nulled beams of the LEO satellite 110 to be angularly adjusted to account for the satellite movement relative to the particular area. This allows the formed or nulled beams of the satellite to be adjusted to better track and target the particular terrestrial area for improved communication efficiency. In some embodiments, the array factor coefficients can be set according to the ephemeris data for a pass over a known terrestrial area (containing a field of target devices for communication) and the array factor coefficients are maintained for a scheduled time (e.g. the entire pass-over period for that target terrestrial area) while the digitally formed or nulled beams pass over that area. The array factor coefficients can then be reset according to the ephemeris data for the next target terrestrial area that the LEO satellite is scheduled to pass over.

Ground station 130 is a terrestrial radio station designed for receiving and transmitting signals or radio waves from each of the LEO satellites 110. Ground station 130 comprises suitable antennas to communicate with the LEO satellites 110 and suitable network interface components to convey data received from the LEO satellites 110 to a network 150. Network 150 may be or include a data network, such as the Internet, over which the client device 140 may receive or access the data received by the ground station 130. The client device 140 may be a computer server or an end-user computing device such as a desktop, laptop, smartphone or tablet, for example.

Figure 2:
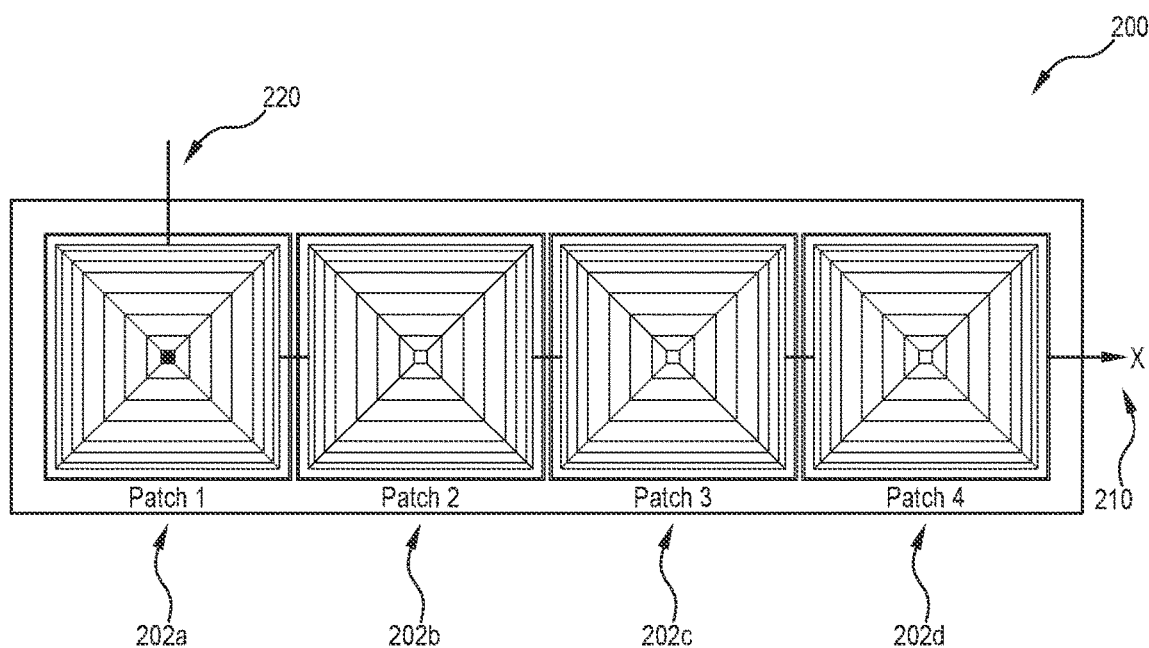
FIG. 2 is a plan view of a patch antenna array according to some embodiments.

FIG. 2 is an example plan view of a patch antenna array 200 of the communication system according to some embodiments. The patch antenna array 200 is shown as a linear array. Antenna elements of a linear array are positioned along one linear dimension, i.e. the antenna elements are positioned along one line to form the patch antenna array. The patch antenna array 200 is shown as an array of antenna elements situated on a common base plane defined by or mounted on a chassis of the LEO satellite 110. Each antenna element or patch antenna 202a, 202b, 202c, 202d of the patch antenna array 200 has a cupped stacked patch configuration. In some embodiments, the antenna element or patches 202a, 202b, 202c, 202d may be uniformly spaced from each other. The antenna array 200 may also comprise two coaxial probes 210 and 220. The probes 210 and 220 are orthogonal to each other (i.e. 90 degrees apart) and may be axially fixed to withstand vibrations during a launch of the LEO satellite 110.

In some embodiments, for use with a 6U CubeSat, for example as shown in FIG. 2, the antenna array 200 may have 4 linearly aligned antenna elements, with overall dimensions of around 81 mm (width)×301 mm (length)×15 mm (depth/thickness), for example. In other embodiments, the width, length and depth dimensions may vary somewhat while remaining within the dimensional constraints of the LEO chassis to which the antenna array is to be mounted. In some embodiments, the antenna array 117 may alternatively be implemented using a rectangular array, an L-shaped array or a circular array, for example. A uniform or non-uniform distance may be used to space the antenna elements of the rectangular array or the circular array.

Figure 3:
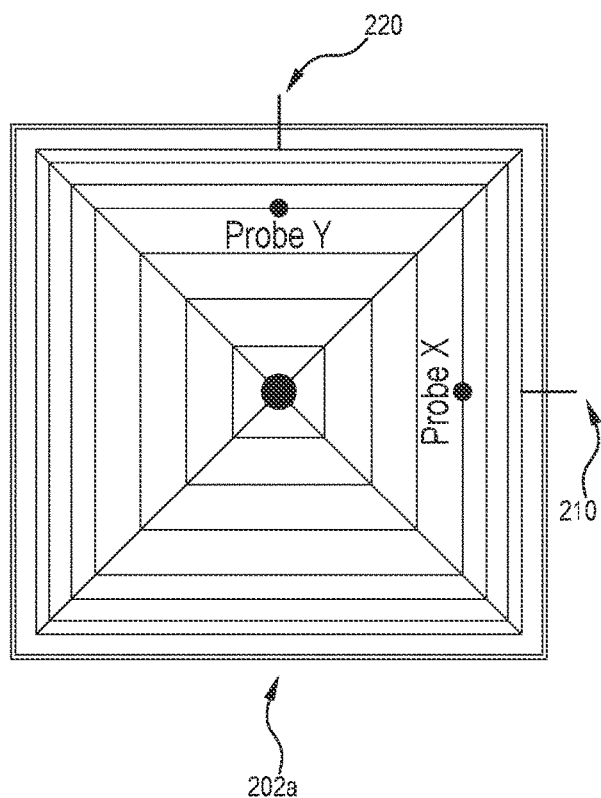
FIG. 3 is a plan view of an antenna array element according to some embodiments.

FIG. 3 is a plan view of an example antenna array element or an antenna 202a of the antenna array 200 according to some embodiments. The probes 220 and 210 make contact with the antenna array element 202a at points Y and X respectively on the lower (excitation) patch.

Figure 4:
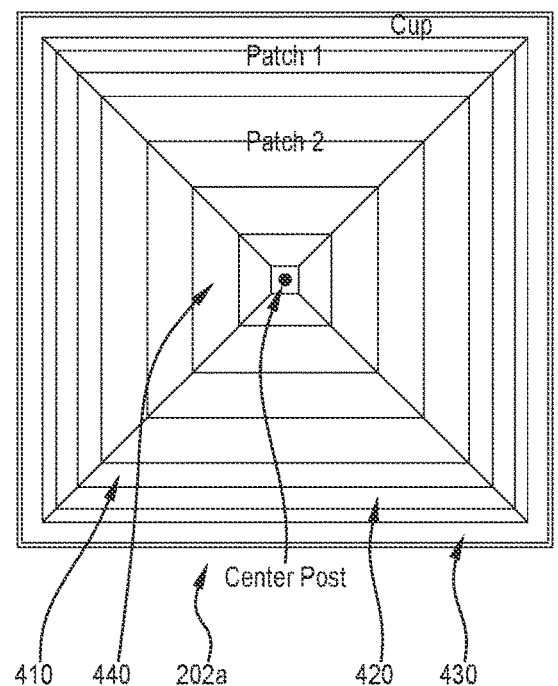
FIG. 4 is a further plan view of an antenna array element according to some embodiments.

FIG. 4 is a further plan view of an example antenna array element 202a of the antenna array 200 according to some embodiments. FIG. 4 illustrates a first (upper) strip/patch 410, a second (lower) strip/patch 420 and a cup 430. The cup 430 is embedded or positioned or incorporated on an outer surface of a chassis of the LEO satellite 110. The patches 410 and 420 may be embossed with a thinner patch for greater mechanical stability. The two patches 410 and 420 are mechanically supported by a centre post 440. The lower patch 420 is galvanically excited via the two orthogonal coaxial probes 220 and 210. In some embodiments, the lower patch can be excited by contactless electromagnetic couplings either by a proximity probe (capacitive coupling excitation) or through a slot manufactured in the ground plane (aperture coupled excitation).

Figure 23:
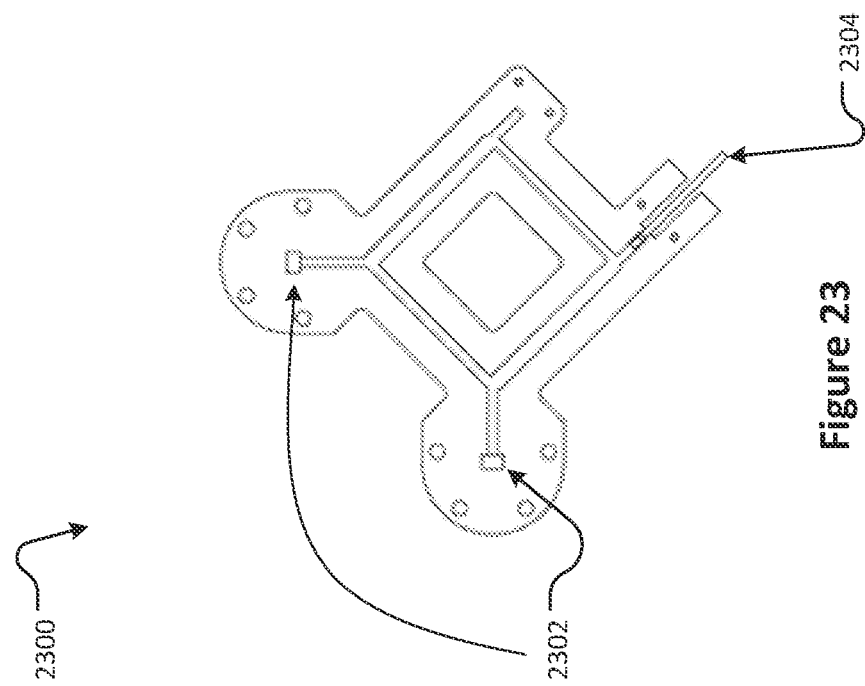
FIG. 23 a schematic diagram to illustrate a microstrip conductive circuit layer for a single antenna according to some embodiments.

In some embodiments, underneath patch 420 lies a microstrip hybrid network (see FIG. 23, for example). The microstrip hybrid network may create two ports, one Right Hand Circular Polarised (RHCP) port and another Left Hand Circular Polarised (LHCP) port. Incorporation of left hand or right hand circular polarisation of transmissions allows for the simultaneous transmission of two independent signals, one on each polarisation, because the transmitted signals comprise oscillations in orthogonal planes, as opposed to oscillation in a single plane of a single polarised transmission. Circularly polarised transmissions are more robust in response to problems associated with signal reflection or lack of a clear line of sight to the transmission target.

Figure 5:
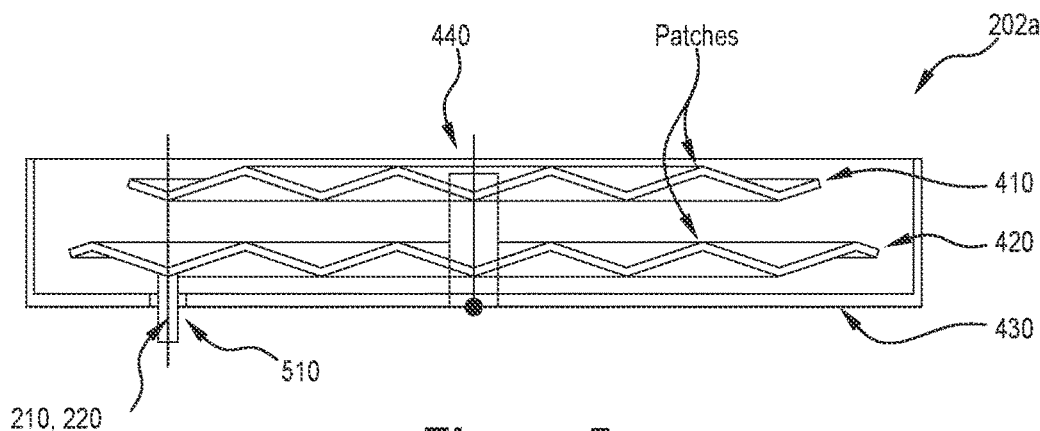
FIG. 5 is a side cross-section view of the antenna array element of FIG. 4.

FIG. 5 is a side cross-section view of the antenna array element 202a shown in FIG. 4. The cup 430 has a base and four side walls surrounding the patches 410, 420, to define an open top of the cup. The cup 430 has spaced openings 510 in the base through which both the probes 210, 220 respectively pass towards patches 410 and 420.

Figure 6:
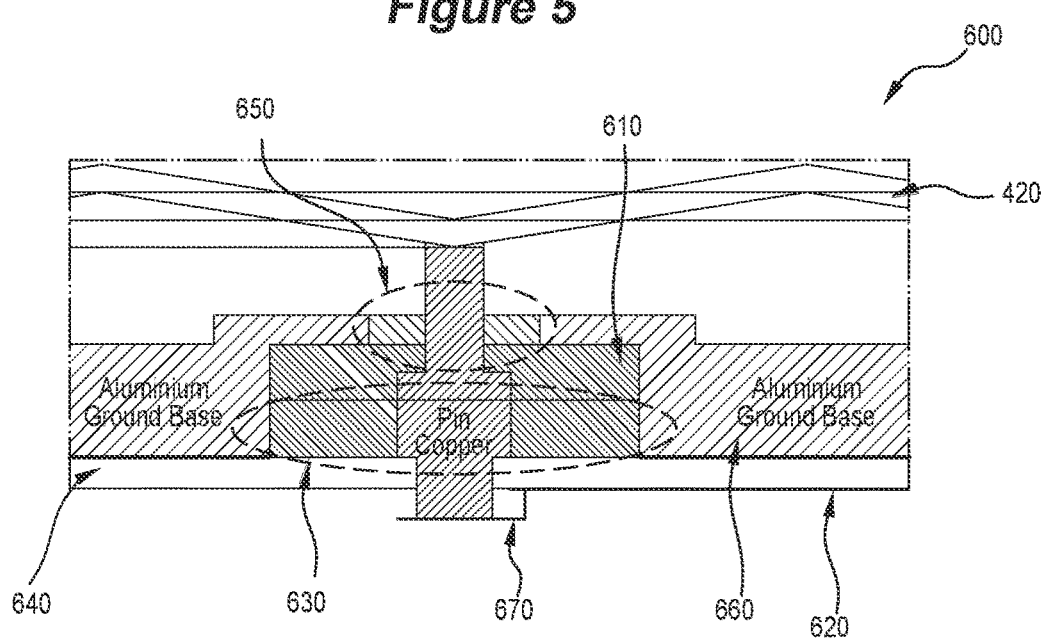
FIG. 6 is a close-up cross-sectional side view of a probe part an antenna array element according to some embodiments.

FIG. 6 is a close-up cross-sectional side view of a probe part 600 of the antenna array element 202a of the antenna array 200 according to some embodiments. The probe part 600 comprises coaxial probes 630 and 650. In some embodiments, the coaxial probes or probes 630 and 650 may have a resistance of 50 ohms. The probes are surrounded by a Teflon sleeve 610, which is in turn surrounded by an aluminium ground base 660. At the bottom of the probe, part is a ground plane 640. Between ground plane 640 and a surface of a chassis of the LEO satellite 110 lies a microstrip 620. In some embodiments, the microstrip 620 may have a resistance of 50 ohms. At the bottom of the coaxial probe 630 lies a whisker copper wire 670, according to some embodiments. The whisker copper wire 670 connects the probes 630 and 650 to the microstrip 620. In some embodiments, the whisker copper wire 670 may be soldered using a Sn96/Ag4 alloy solder. A dielectric supporting the microstrip 620 may be Rodgers RT-Duroid 6002 (Relative Permittivity 2.94) with dielectric thickness 508 μm (about 0.5 mm), and metallization on both sides at 17 μm (0.017 mm) of Copper thickness, for example.

Figure 7:
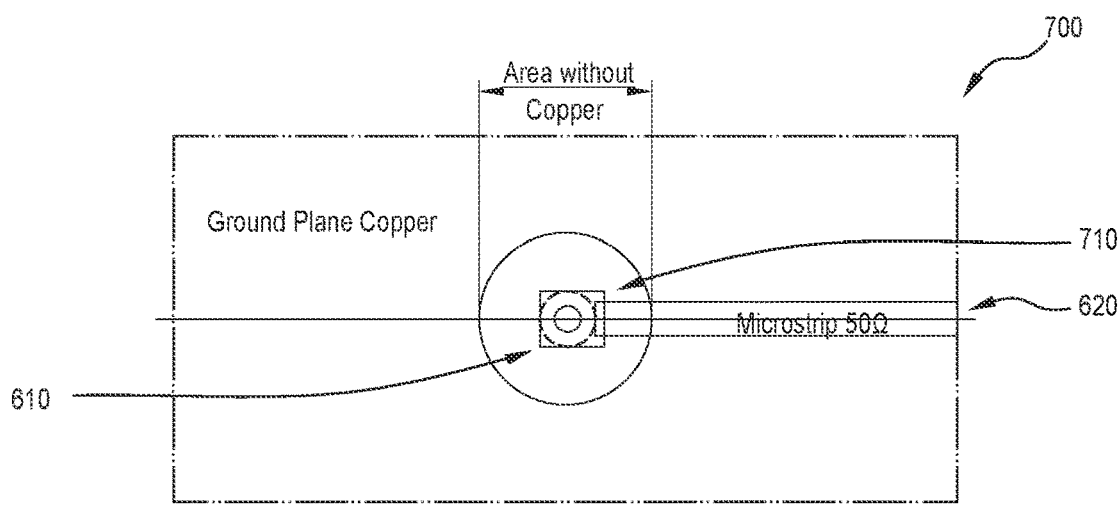
FIG. 7 is a top view of a ground plane of an antenna array element according to some embodiments.

FIG. 7 is a top view of a ground plane 700 of the antenna array element 202a, according to some embodiments. The ground plane metallisation 700 defines an etched area or a discontinuous area 710 such that the excitation probe supported by the dielectric 610 does not contact the ground plane 700.

The phased antenna array of various embodiments disclosed herein is advantageously suited for the creation of multiple simultaneous transmit or receive beams (or for beam nullification) in multiple directions. This increases the communication efficiency of the LEO satellite 110.

In embodiments related to a 6U CubeSat, spatial limitations on the 6U selected satellite chassis platform resulted in the need to fit the antenna array into a maximum of 310× 90×14 mm³ volume on one side of the satellite body.

To perform array beam scanning, the radiating elements in the array should not be arbitrarily separated but should have a separation distance as a function of the array beam scan angular range. If the antenna element to antenna element spacing is too large, grating lobes (which are a sort of parasitic radiation lobe) can appear in the antenna radiation patterns. Such grating lobes can be detrimental to the performance of the antenna system and by reducing signal transmission efficiency which can ultimately negatively affect the performance of the whole satellite.

In some embodiments based on a 6U chassis, a 75 mm (centre to centre) antenna element to antenna element separation may be used for communication in S-band frequencies. The adjacent edges of adjacent antenna elements may be separated by about 3 mm to about 5 mm, for example. Antenna accommodation on the satellite can be more of a performance-limiting factor than the RF performance (i.e. avoiding grating lobes) in some embodiments. The desired RF performance of the antenna array can be maintained in receive mode with an antenna element to antenna element spacing of 78 mm without significant changes if the spatial accommodation of the antenna array on the satellite allows for such antenna element to antenna element spacing.

As a general rule, the performance of a patch antenna is reduced in terms of bandwidth when the element is small, and/or extremely low profile. To achieve the RF performance desired for satellite communication functionality of 6 U satellite embodiments as described herein but with an element that could fit into an array cell with a maximum length of 75 mm, lengthwise compression or surface variation or a wave or corrugation may be formed in the cross-section of the patch radiators to increase their RF electrical lengths while maintaining the reduced mechanical length. The waving or corrugation of the patch surface allows a physical patch size reduction of a few percent, but this may be sufficient to allow the desired RF performance within the constrained physical space of the CubeSat chassis.

However, the wave or corrugation patterning of the patch surface may introduce manufacturing challenges as it is not suitable for conventional machining of patch antenna radiators. According to some embodiments, 3D printing of the patch antenna in Aluminum with the wave or corrugation patterning can be used for the manufacturing of the patch antenna. However, 3D printing of the wavy or corrugated patches is challenging because of the shape and nature of the patch antenna and the current physical constraints of 3D printing machines and processes.

FIG. 8 is a schematic diagram of a top view of an antenna array 800 according to some embodiments. The antenna array 800 comprises 4 antennas 810. In some embodiments, the antenna array 800 may comprise 2, 3, or more than 4 antennas 810. Each antenna 810 may comprise at least two elements or patches, a parasitic element/patch (820) and an excitation element/patch (910 in FIG. 9). In some embodiments, each antenna 810 may comprise more than one parasitic patch. The parasitic patch and the excitation patch may be disposed substantially parallel to each other. During transmission by the antenna array 800, the excitation element receives a signal feed from feed lines and generates transmission radiation based on the feed it receives. The parasitic element is designed to resonate with the excitation element and improve the directivity and gain of the radiation pattern generated by each antenna 810. The parasitic element also improves the directivity and gain of the radiation pattern generated by each antenna over a larger frequency bandwidth. Similarly, for the reception of signals, the parasitic element improves the quality and strength of the radiation pattern received by each antennal 810 and increases the radiating element frequency bandwidth.

The antenna array 800 also comprises a tuning element 830 to act as a calibration probe. The tuning element 830 is used to tune the processing logic of the RF front end 115 and/or the reconfigurable logic processing device 114 after the antenna array 800 is deployed. The tuning element 830 may generate transmissions or receive signals transmitted by each antennal element 810 during the tuning (calibration) process. Based on a response of each antenna element 810 to the transmissions by the tuning element 830 and/or the response of the tuning element 830 to the transmissions by each antenna element 810, various signal processing parameters/configurations in the RF front end 115 or the reconfigurable digital logic processing device 114 may be optimized to tune each antenna element 810. In some embodiments, the tuning element 830 may be made out of brass and a feeding line (e.g. a coaxial cable) may be provided to connect the tuning element 830 to the RF front end 115.

In the antenna array 800, the antennas 810 are linearly arranged to form a linear antenna array. In some embodiments, the antennas 810 may be arranged in a two-dimensional pattern to form a non-linear array. For example, in some embodiments, the antennas 810 may be arranged in a two-dimensional array pattern of 4×3 (including 12 antennas 810). In some embodiments, the antennas 810 may be arranged in a two-dimensional array pattern of 4×N. In the antenna array 800, each antenna element 810 is equally spaced from each other to form the linear antenna array 800. In some embodiments, the antennas 810 forming a part of an antenna array may not be equally spaced from each other. The antennas 810 provide the flexibility of forming antenna arrays of different orientations that may specific deployment constraints associated with specific chassis of LEO satellites.

Each antenna 810 may have a lateral length and width of about 5 to 30 mm, according to some embodiments. Each antenna 810 may have a lateral length and width of about 8 to 15 mm, according to some embodiments. Each antenna 820 may have a depth of about 1 to 5 mm, according to some embodiments. Each antenna 820 may have a depth of about 1 to 2 mm, according to some embodiments.

FIG. 9 is a cross-section view 900 of the antenna element 810 illustrating the parasitic element or parasitic antenna patch body 820 and an excitation element or excitation antenna patch body 910. Provided in excitation element 910 is a probe region 904. A thickness 902 of the probe region in the direction of a central axis 1312 (FIG. 13) may be about 2 mm. Thickness 902 may be marginally greater than a peak-to-peak depth (distance from highest point to lowest point) of the corrugations of each patch body 820, 910. The probe region 904 allows the connection of a feeding probe to the excitation element 904 to transmit feed signals from the RF front end 115 or convey signals received by the antenna element 810 to the RF front end 115. The antenna element 810 also comprises a threaded aperture 906 to receive a support screw to mount the antenna element 810 on a ground plane (shown in FIG. 13). The excitation element 910 may also comprise RF balancing elements 912. The RF balancing elements 912 mimics the structure and RF characteristics of the probe region 904 to balance RF transmissions or reception by the entire excitation element 910. The thickness of the cross-section 908 of the antenna element may be 4.8 mm in some embodiments.

The excitation element 910 may be longer in cross-section than the parasitic element 820. The cross-sectional orientation or pattern of the excitation element 910 and the parasitic element 820 may closely mirror each other to allow the two elements to resonate during transmission or reception of signals. Positioned between the parasitic element 820 and the excitation element 910 is a connecting element or central portion 916.

The body of the antenna element 810 may be 3D printed. However, the complex stacked patch structure of the antenna element 810 may make it challenging to 3D print the entire antenna element 810 as a single unit. Printing disjoint elements of the antenna separately, for example, printing or otherwise forming the parasitic element 820 and the excitation element 910 separately, may alleviate the manufacturing challenges of forming the elements as a single unit. However, separate printing or manufacturing of the two elements 820 and 910 and combining them to form the antenna element 810 may introduce undesirable RF characteristics in the antenna element 810 and unnecessary assembly and part alignment complexity. Combining separately manufactured or printed elements 820 and 910 may also make the assembly and calibration process of the antenna array 800 more complex. The introduction of additional parts in the antenna array 800 makes the overall array less robust.

3D printing the entire antenna element 810 allows the use of a uniform or continuous metal material which provides more optimal RF characteristics for transmission or reception of signals. The connecting element 916 may be so shaped to allow the 3D printing of the entire antenna element 810 as a single part. 3D printing by extrusion of metal requires a continuous support structure to allow the entire antenna element 810 to be printed. In some embodiments, the antenna element 810 may be printed whereby the excitation element 910 is printed first, followed by the connecting element 916. After printing of the connecting element 916, the parasitic element 820 may be printed using the connecting element 916 as a support structure for the rest of the printing. In some embodiments, the aperture or bore 906 or the aperture in the probe region 904 may be formed as part of the 3D printing process. The bore 906 allows the coupling of the antenna 810 to an antenna base. The apertures may be subsequently threaded to allow screws to be received in the apertures for the antenna assembly. In some embodiments, the antenna patch bodies 820 and 910 may be substantially square or rectangular.

FIG. 10 illustrates an expanded view of the probe region 904 according to some embodiments. The probe region 904 comprises a threaded aperture 1002 to receive a probe 1004.

Figure 11:
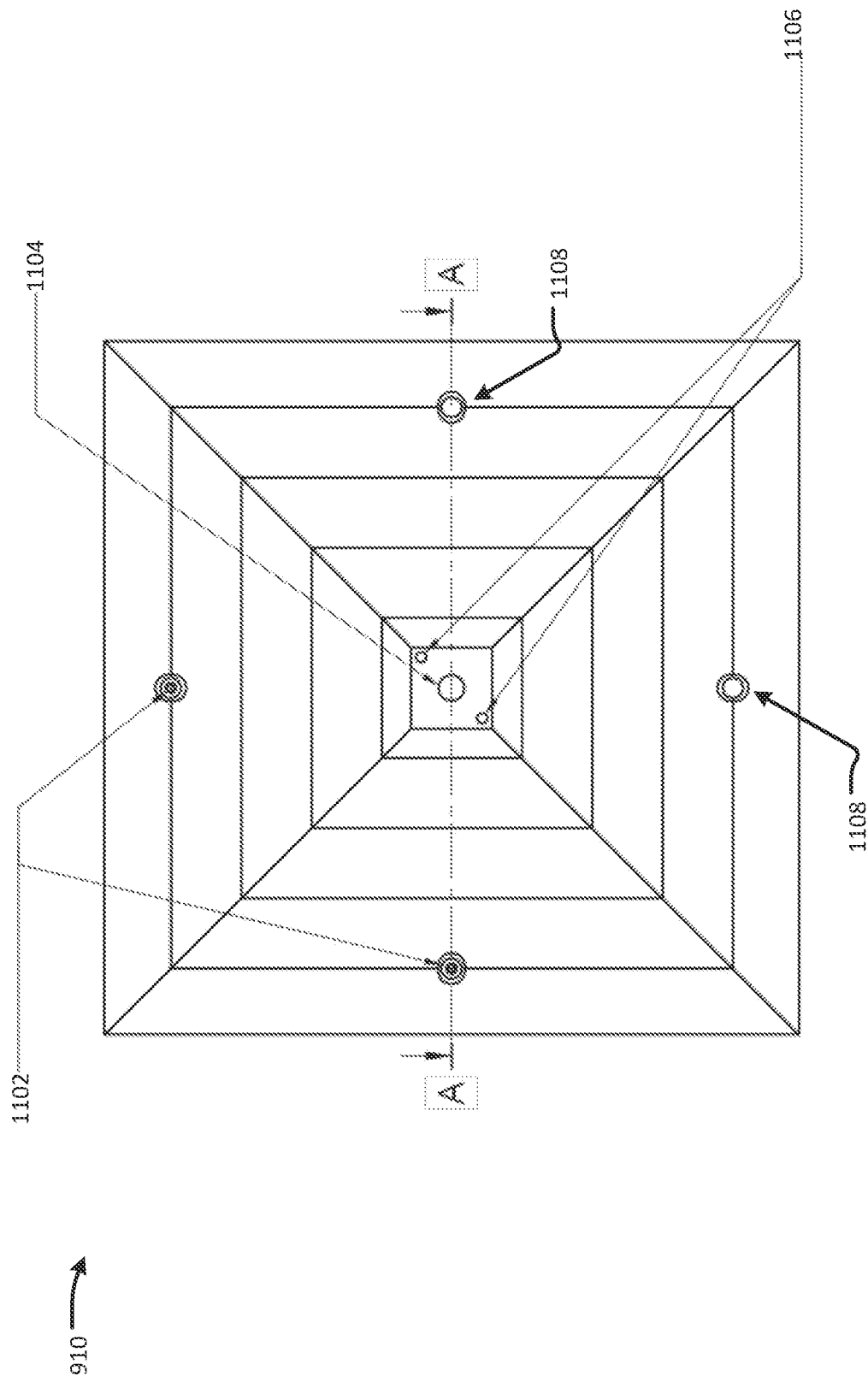
FIG. 11 is a bottom view of an antenna element according to some embodiments.

FIG. 11 illustrates a top view of the excitation element 910 according to some embodiments. The excitation element 910 comprises two probe receiving elements 1102 and two RF balancing elements 1108. The excitation element 910 also comprises a threaded aperture 1104 to receive a supporting screw and two pinholes 1106. The pin holes 1106 in some embodiments may be dowel pin holes that allow the positioning of dowel pins to further physical reinforce the antenna element 810.

Figure 12:
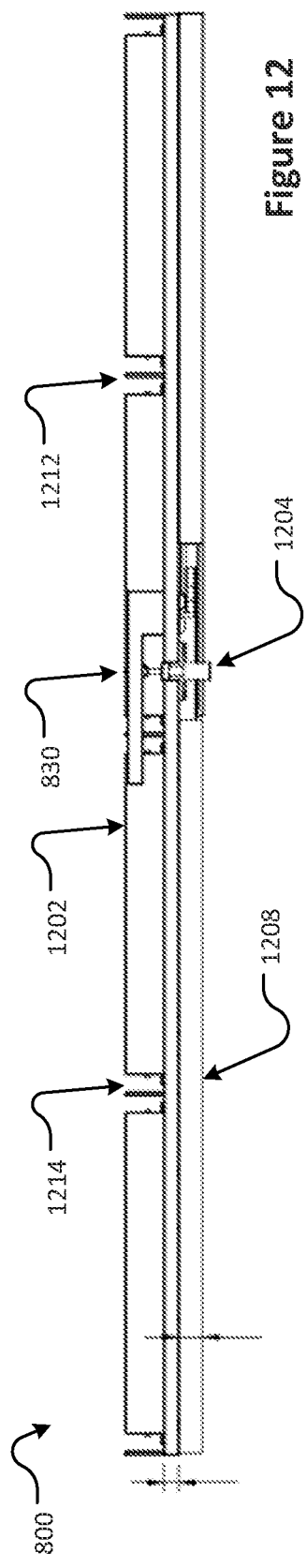
FIG. 12 is a side view of the antenna array shown in FIG. 8.

FIG. 12 is a side view of the antenna array 800 illustrating the tuning element 830 in communication with an adapter 1204. The adapter 1204 in some embodiments may be constructed out of brass and is connected to an RF feed cable to convey signals between the tuning element 830 and the RF front end 115. Also illustrated in FIG. 12 are side walls 1202 that are positioned around each antenna element 810. Also illustrated in FIG. 12 are walls 1212 positioned between two antenna elements 810. The walls 1202 and 1212 define a physical barrier around each antenna element 810 to secure the antenna elements 810. As illustrated in FIG. 12, gaps may be defined between walls 1202. Also illustrated is ground plane 1208 which may house circuitry such as PCBs to process RF signals between the probe region 904 and the RF front end 115. A gap 1214 may be provided between walls 1202. The walls 1202 and 1212 together form a cup of each antenna 810 and provide a degree of antenna-to-antenna isolation in the antenna array 800 when each antenna 810 is simultaneously transmitting or receiving signals.

Figure 13:
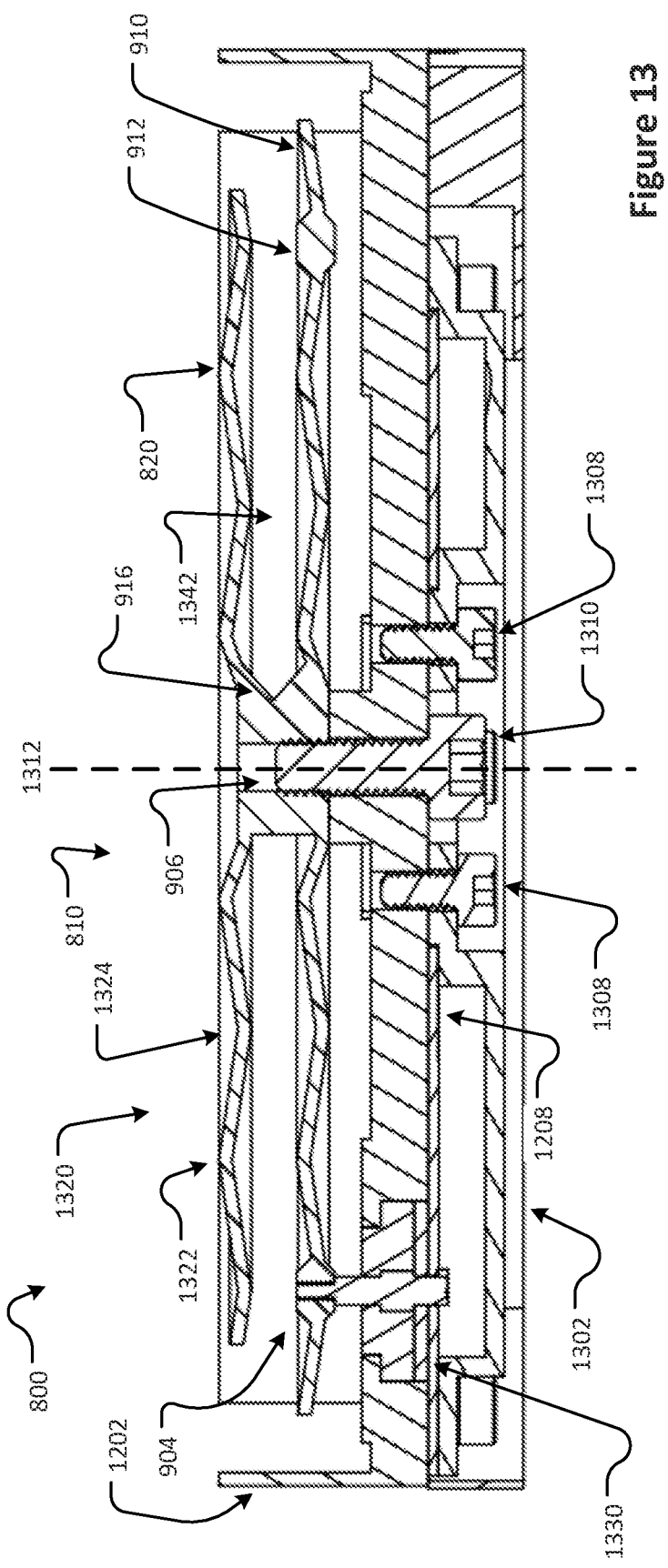
FIG. 13 is a side cross-sectional view of a single antenna according to some embodiments.

FIG. 13 is a side cross-section view of antenna element 810 positioned in an antenna array frame 1302, according to some embodiments. Illustrated in FIG. 13 is a connecting element 916, which forms a central portion positioned centrally on and between the parasitic element 820 and the excitation element 910. Also illustrated is a base plane 1302 that allows the mounting of the ground plane 1208 and the antenna element 810. Screws 1308 affix the ground plane 1208 to the base plane 1302. Screw 1310 affixes the antenna element 810 to the base plane 1302. M2 and/or M3 screws may be used for coupling compoents to the base plane 1302. The base plane 1302 allows the entire antenna array 800 to be affixed to a chassis of the LEO satellite 110. Defined about a geometrical centre of the antenna element 810 is an axis 1312. There is also provided a probing element 1330 that allows RF communication between the excitation element 910 and an RF feed connecting the excitation element with the RF front end 115. The galvanic coupling in the probing element 1330 can be replaced by capacitive coupling, or by an aperture coupling where a slot is manufactured in the ground plane.

Both the parasitic element 820 and the excitation element 910 may comprise corrugations 1320 defined by ridges such as ridge 1322 and grooves such as groove 1324. The corrugations as defined in both the parasitic element 820 and the excitation element 910 are substantially parallel. The corrugations allow a longer antenna element to be positioned in a smaller space providing greater RF transmission or reception capability in a more confined space. In the LEO satellite 110, space for the positioning element of a chassis of the satellite is often limited and the corrugations allow maximization of the RF communication capability despite the limited space available for the antenna array. In some embodiments, a distance between two adjacent ridges 1322 may be from 8 mm to 14 mm. In some embodiments, a distance between two adjacent ridges may be from 10 mm to 12 mm. In some embodiments, a depth of the groove 1324 may be from 0.5 mm to 1.5 mm. In some embodiments, a depth of the groove 1325 may be around 1 mm. The corrugations 1320 may be defined at a shallow angle. For example, in some embodiments, the corrugations 1320 may be defined at an angle of 2 degrees to 20 degrees. In some embodiments, the corrugations 1320 may be defined at an angle of 5 degrees to 15 degrees. In some embodiments, the corrugations 1320 may be defined at an angle of 8 degrees to 12 degrees.

The parasitic element 820 and the excitation element 910 of some embodiments may not comprise any corrugations. The parasitic element 820 and the excitation element 910 of some embodiments may have a rectangular or square substantially planar profile.

As illustrated in FIG. 13, a gap 1342 is provided between elements 910 and 820. In some embodiments, the gap 1342 may be an air gap and no dielectric material may be present in the gap 1342.

The surface corrugations of the parasitic element 820 and the excitation element 910 may be aligned with each other so that separation of the antenna patch bodies is substantially constant in a direction parallel to the central axis 1312.

Figure 14:
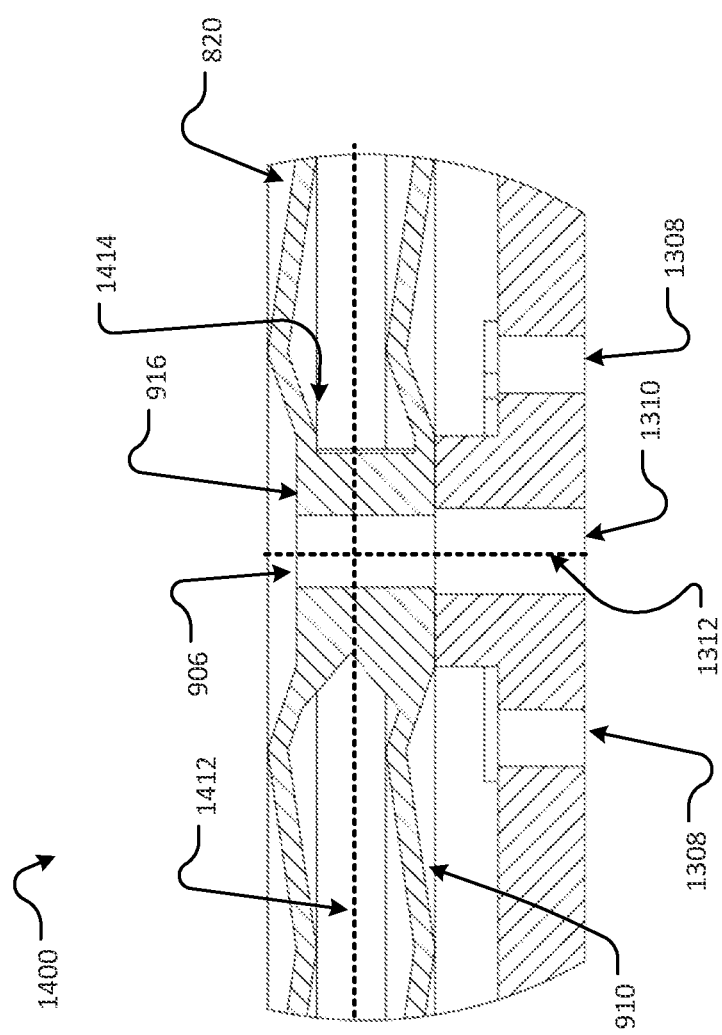
FIG. 14 is a cross-sectional view of a centre portion of an antenna according to some embodiments.

FIG. 14 is a cross-section view of a centre portion 1400 of the antenna element 810 illustrating in greater detail the connecting element or central post 916. An axis 1412 passes through the centre of the connecting element 916 about which the connecting element may be symmetrically disposed. The connecting element 916 comprises a wedge region or converging wall portion 1414 that extends away from the axis 1412 and towards each of the parasitic element 820 and the excitation element 910. The wedge region or converging wall portion 1414 of the connecting element 916 forms a part of the structure that allows 3D printing the entire antenna element 810 as a single unit without substantially affecting the RF characteristics of the antenna element 810.

Figure 15:
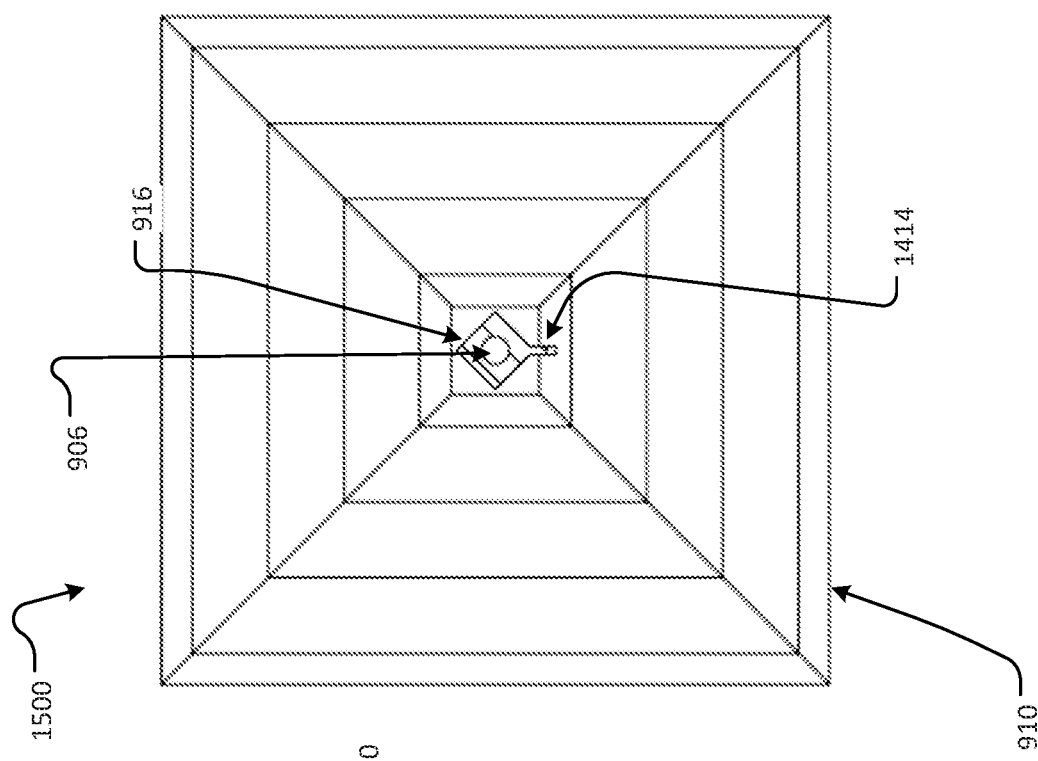
FIG. 15 is a cross-sectional view of a lower antenna patch element and central portion, where the section is taken at a point between the upper and lower patches of the antenna element of FIG. 9.

FIG. 15 is a cross-section view 1500 of the excitation element 910 and the connecting element or central portion 916 as viewed with the parasitic element 820 taken off. As illustrated in view 1500, the connecting element 915 has a square-shaped cross-section with the wedge region 1414 disposed on one corner of the square. The square shape of the connecting element or central portion 916 is diagonally aligned with the square shape of the excitation element 910 and the parasitic element 820 for improved 3D printing manufacturing efficiency.

As illustrated in FIG. 15, in some embodiments the central portion 916 has a rectangular cross-sectional profile 1502 through the middle of the converging wall portion 1414. In some embodiments, a rectangular cross-sectional profile is angularly offset from a parallel cross-sectional profile of the first or second antenna patch body.

Figure 16:
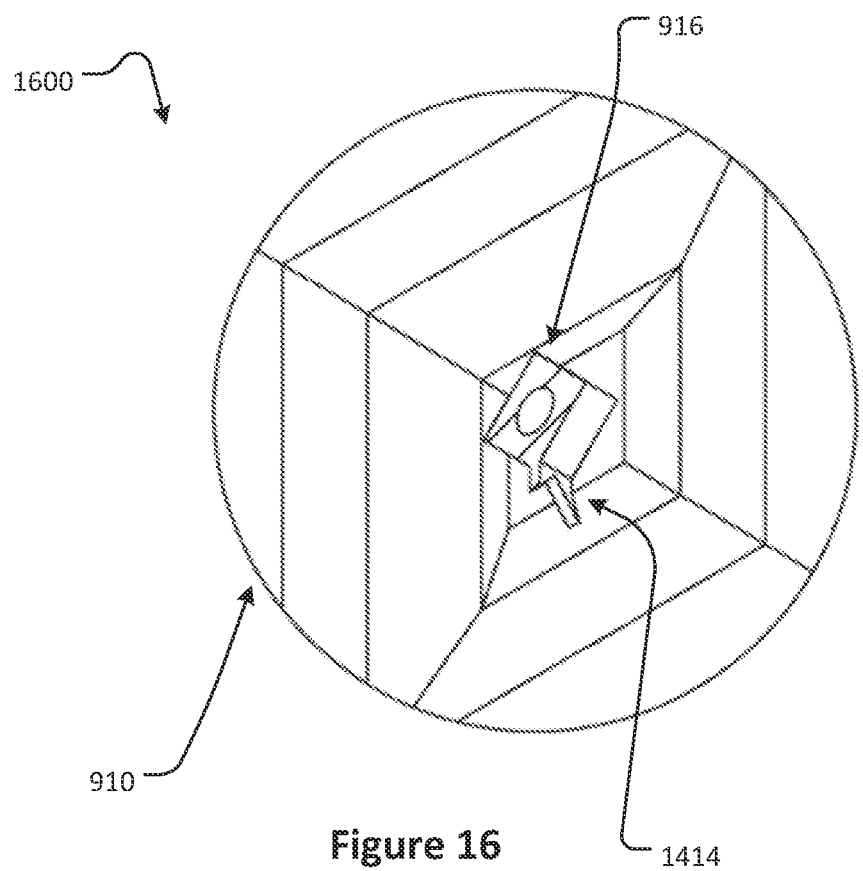
FIG. 16 is a perspective cross-sectional view of a lower antenna patch element and central portion of the antenna element of FIG. 9, where the section is taken at a point immediately below the upper antenna patch element.

FIG. 16 is a side cross-section view 1600 of the excitation element 910 and the connecting element or central portion 916 as viewed with the parasitic element 820 taken off. Illustrated in FIG. 16 is the central portion 916 includes a converging wall portion 1414 that converges inwardly toward an axial middle location (with respect to axis 1312) between the first and second antenna patch bodies. The converging wall portion 1414 may be disposed on one side of the central portion 916.

Figure 17:
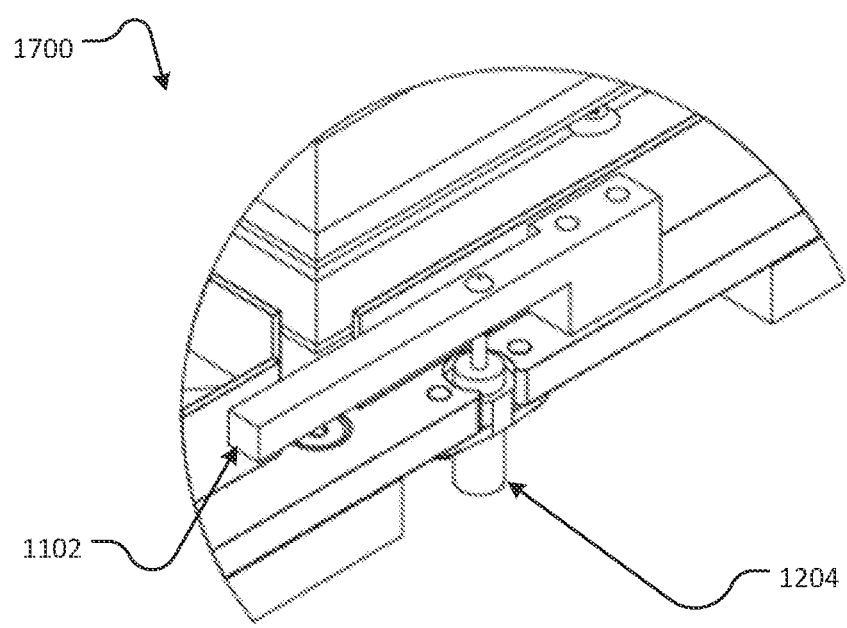
FIG. 17 is a perspective view of a portion of an antenna array according to some embodiments, showing a tuning element in further detail.

FIG. 17 illustrates a side view 1700 of a portion of the antenna array 800 as viewed from a side corresponding to the parasitic element 820. FIG. 17 illustrates the tuning element 1102 in communication with the adapter 1204.

Figure 18:
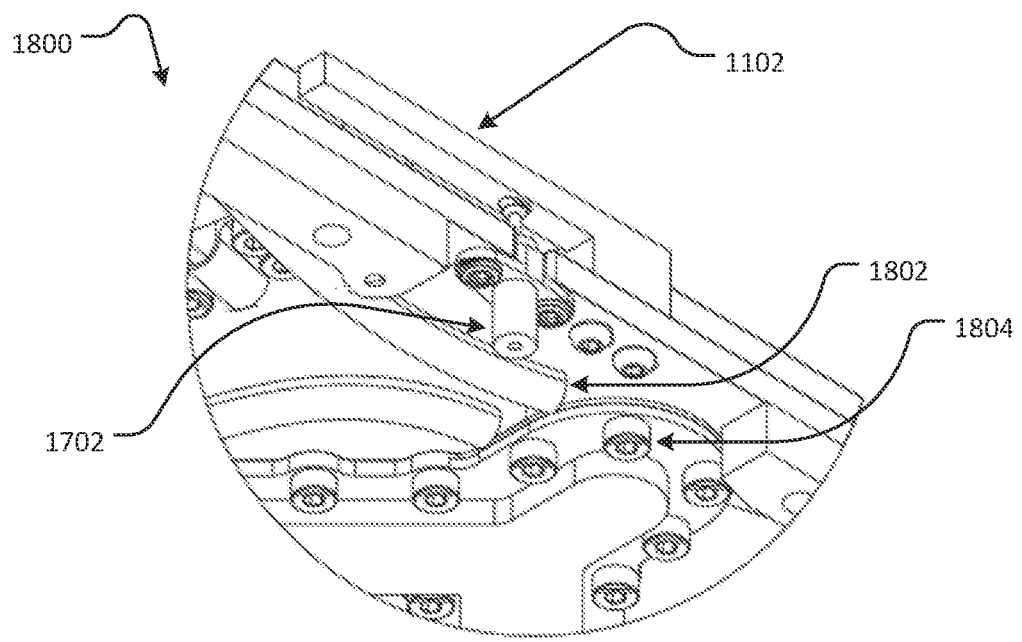
FIG. 18 is a perspective view of a portion of an antenna array according to some embodiments, showing the tuning element in further detail.

FIG. 18 illustrates a side view 1800 of a portion of the antenna array 800 as viewed from a side corresponding to the base plane 1302. Illustrated in view 1800 is a part of an RF feed line 1802 that conveys RF feeds to or from the tuning element 1102. The RF feed line 1802 may project away from the base plane 1302 towards a chassis of the LEO satellite 110. Also illustrated in view 1800 are parts of fastened screws 1804 that secure the various layered component of the antenna array 800.

Figure 19:
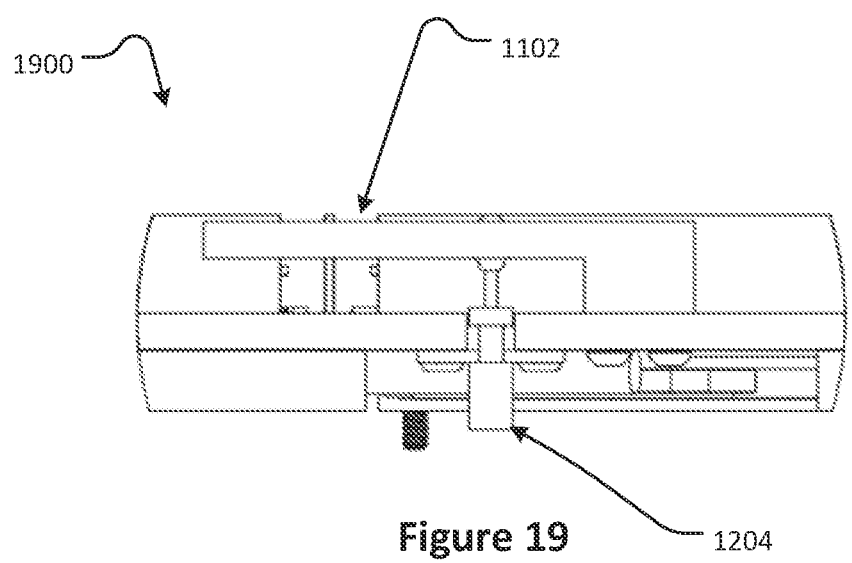
FIG. 19 is a side view of a portion of an antenna array according to some embodiments, showing the tuning element in further detail.

FIG. 19 illustrates a side view 1900 a portion of the antenna array 800 illustrating the tuning element 1102.

Figure 20A:
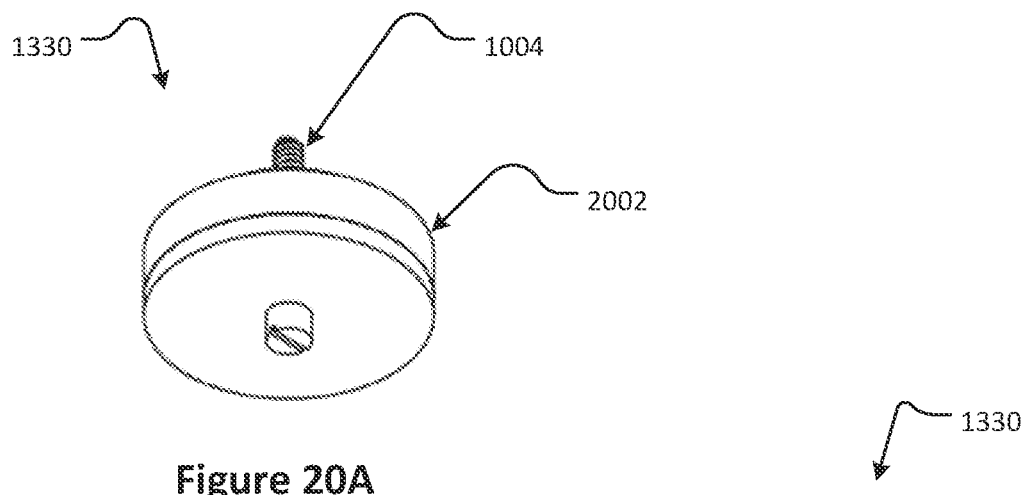
FIGS. 20A, 20B and 20C illustrate a probe element of an antenna array according to some embodiments.
Figure 20B:
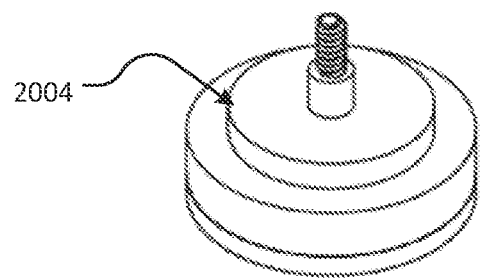
Figure 20C:
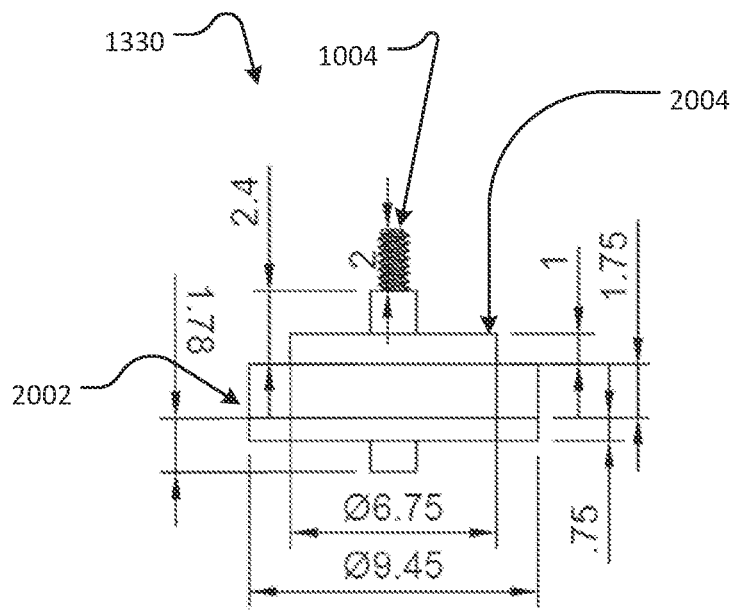

FIGS. 20A, 20B and 20C illustrate a probing element 2000 isolated from the antenna array 800, according to some embodiments. The probing element 2000 comprises a sheath 2002 that provides RF insulation to the probe and a washer 2004 that allows the probing element 200 to be mechanically positioned in the ground plane 1208. The probe 1004 may comprise threading to closely align the probe 1004 within the aperture 1002 of the probe region 904. FIG. 20C illustrates exemplary dimensions of a probing element 2000 according to some embodiments.

Figure 21:
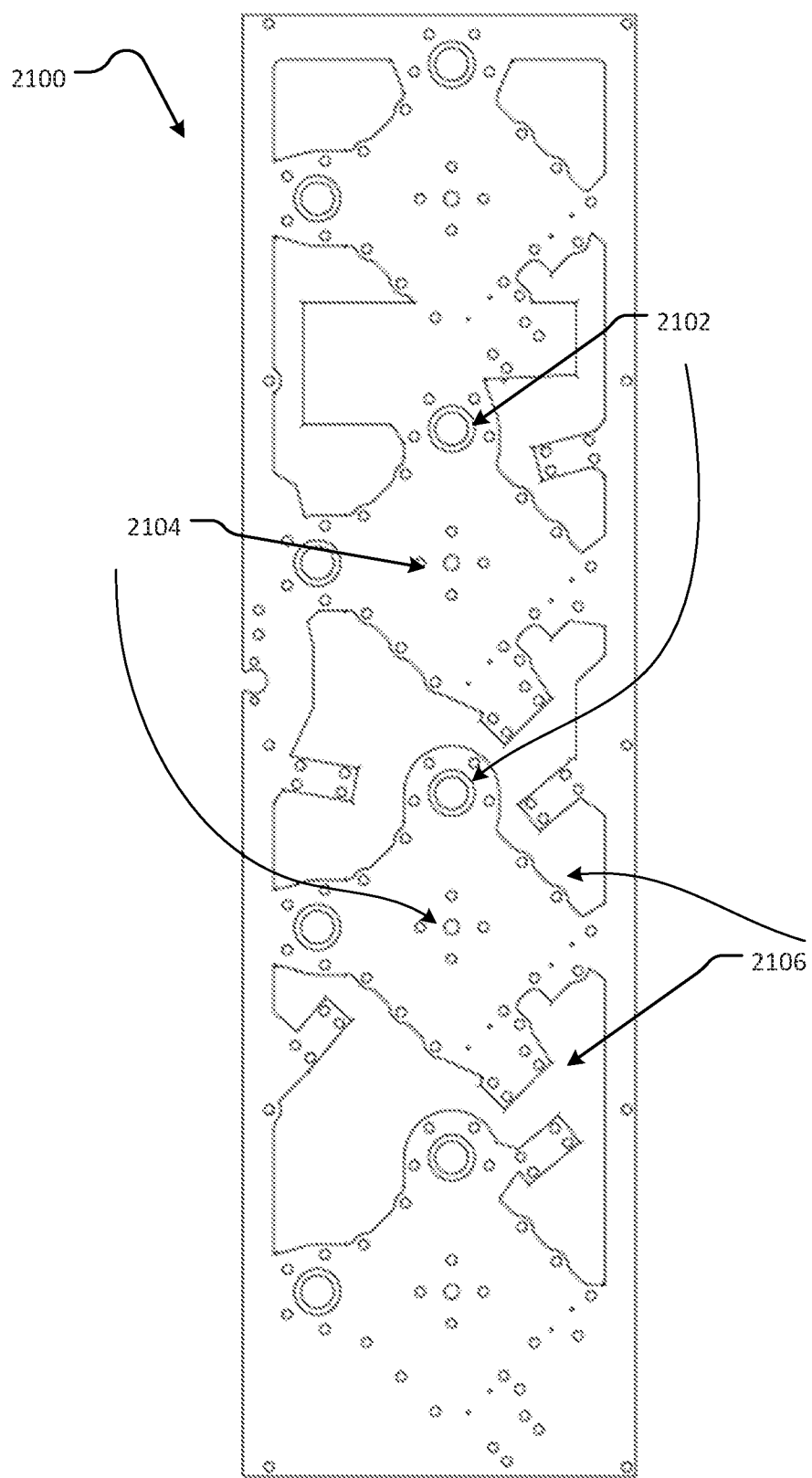
FIG. 21 is a rear view of a ground plane of an antenna array according to some embodiments.

FIG. 21 illustrates a ground plane layer 2100 of the ground plane 1208 according to some embodiments. The layer 2100 is configured to receive an RF microcircuit to allow RF communication between each antenna element 810 and the RF front end 115. Layer 2100 comprises apertures 2102 to receive the probe 1004. Layer 2100 also comprises apertures 2104 to receive a screw or a mounting element to mount each antenna element 810 with the ground plane 1208. There are also provided depressions 2106 in the layer 2100 in parts of the layer 2100 no associated with any threads or mounting element. In some embodiments, the depression 2106 may have a depth of 2 mm.

Figure 22:
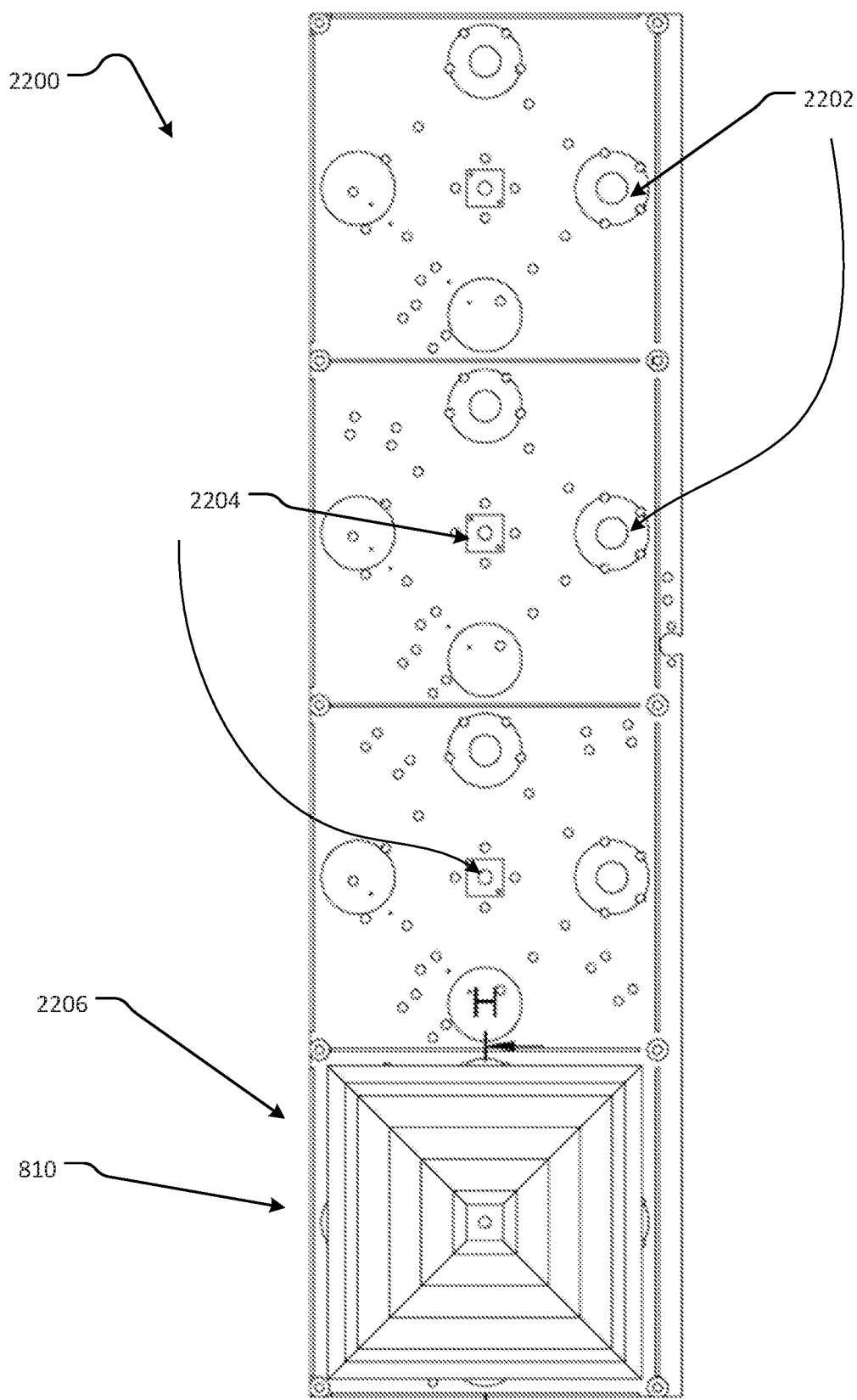
FIG. 22 is a top or plan view of a base of an antenna array, showing an antenna element received in one antenna mounting section of an antenna array, according to some embodiments.

FIG. 22 illustrates an antenna element receiving layer 2200 that may be a part of the ground plane 1208, according to some embodiments. The antenna element receiving layer 2200 comprises various apertures corresponding to the apertures defined in layer 2100. Apertures 2202 for receiving probes 1004 correspond to the apertures 2102 of layer 2100. Similarly, apertures 2204 correspond to the apertures 2104 of layer 2100. A portion 2206 of the antenna element receiving layer 2200 illustrates an antenna element 810 received or positioned on layer 2200.

FIG. 23 illustrates a microstrip layer 2300 configured for coupling with the probing elements 2000 according to some embodiments. The microstrip layer 2300 comprises two probe contact points 2302 where an end of the probe 200 may be received. The microstrip layer 2300 also comprises a feed line or feed end 2304 to feed signals to and from the RF front end 115 through subsequent feed lines (illustrated in FIG. 25).

Figure 24:
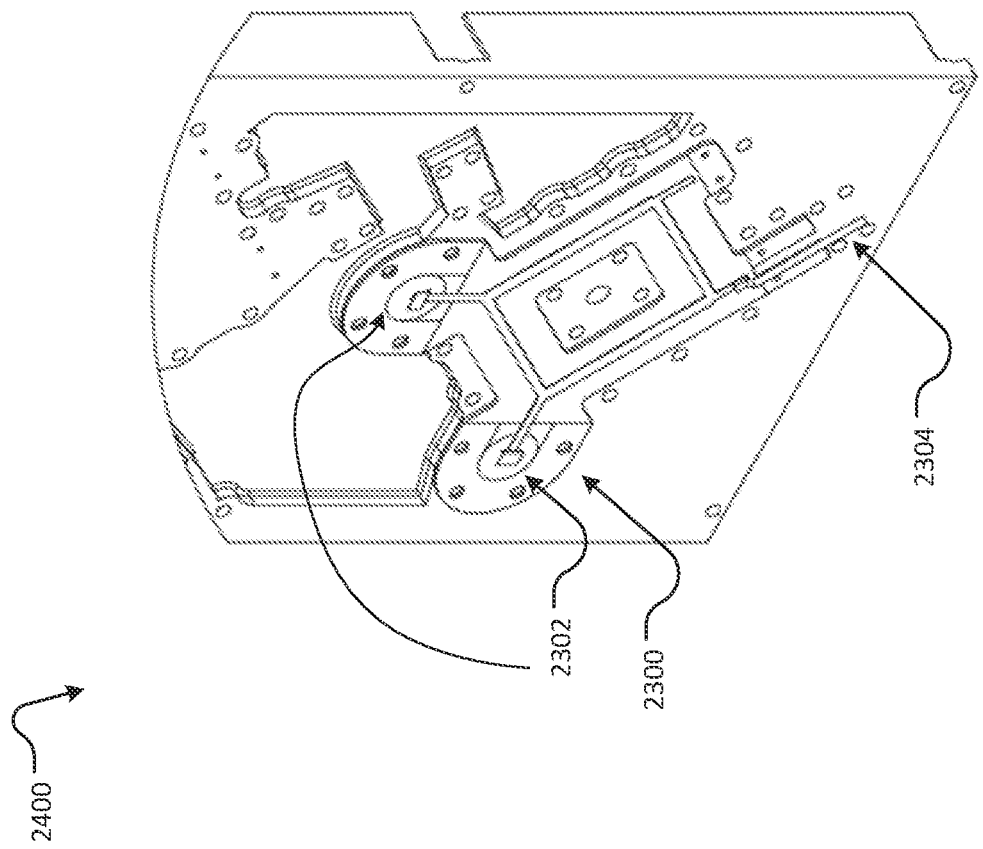
FIG. 24 is a partial perspective view of a rear side of the antenna array to illustrate a microstrip conductive circuit layer positioned over a ground plane according to some embodiments.

FIG. 24 illustrates a view 2400 of the microstrip layer 2300 positioned over the ground plane layer 2100, according to some embodiments. The microstrip layer 2300 is positioned on a side of the ground plane layer 2100 opposite to the side of the ground plane layer that comprises the antenna elements 810. The apertures 2102 of the ground plane layer 2100 are positioned to line up with the probe contact points 2302 when the microstrip layer 2300 is positioned over the ground plane layer 2100.

Figure 25:
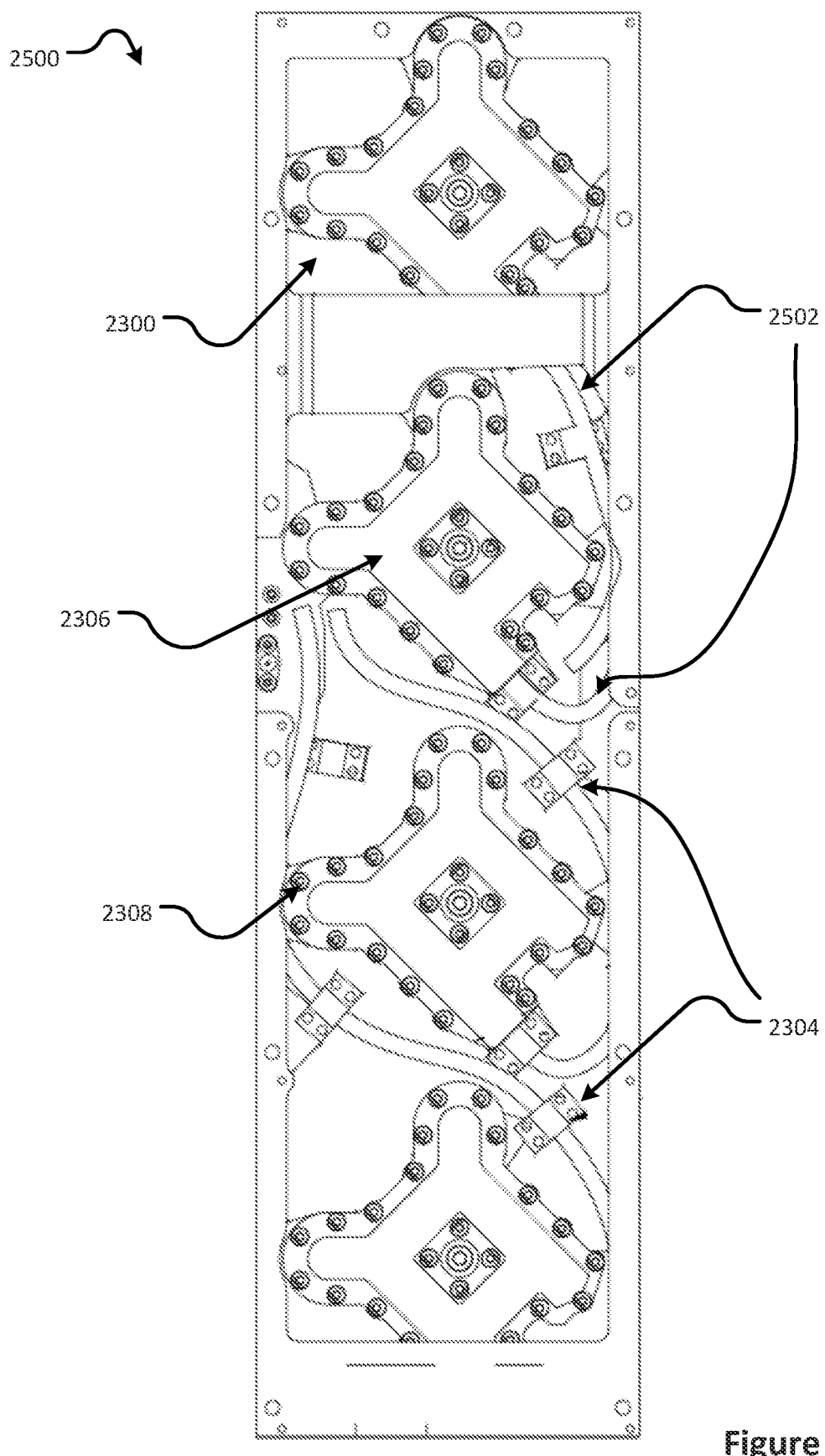
FIG. 25 is a rear view of the antenna array assembled with a mounting layer and showing example cable locations according to some embodiments.

FIG. 25 illustrates a view 2500 of the ground plane layer 2100 assembled with a microstrip layer 2300 for each antenna element 820. Connecting each feeding line 2304 with the RF front end are feed lines or feed cables 2502. In some embodiments, the feed lines or cables 2502 may be rigidified for stability and secured using cable holders 2304. The feed lines or cables 2502 may extend into the cassis of the LEO satellite 110 to feed into the RF front end 115. Each microstrip layer 2300 may be protected by a cover 2306 secured with screws 2308.

Figure 26:
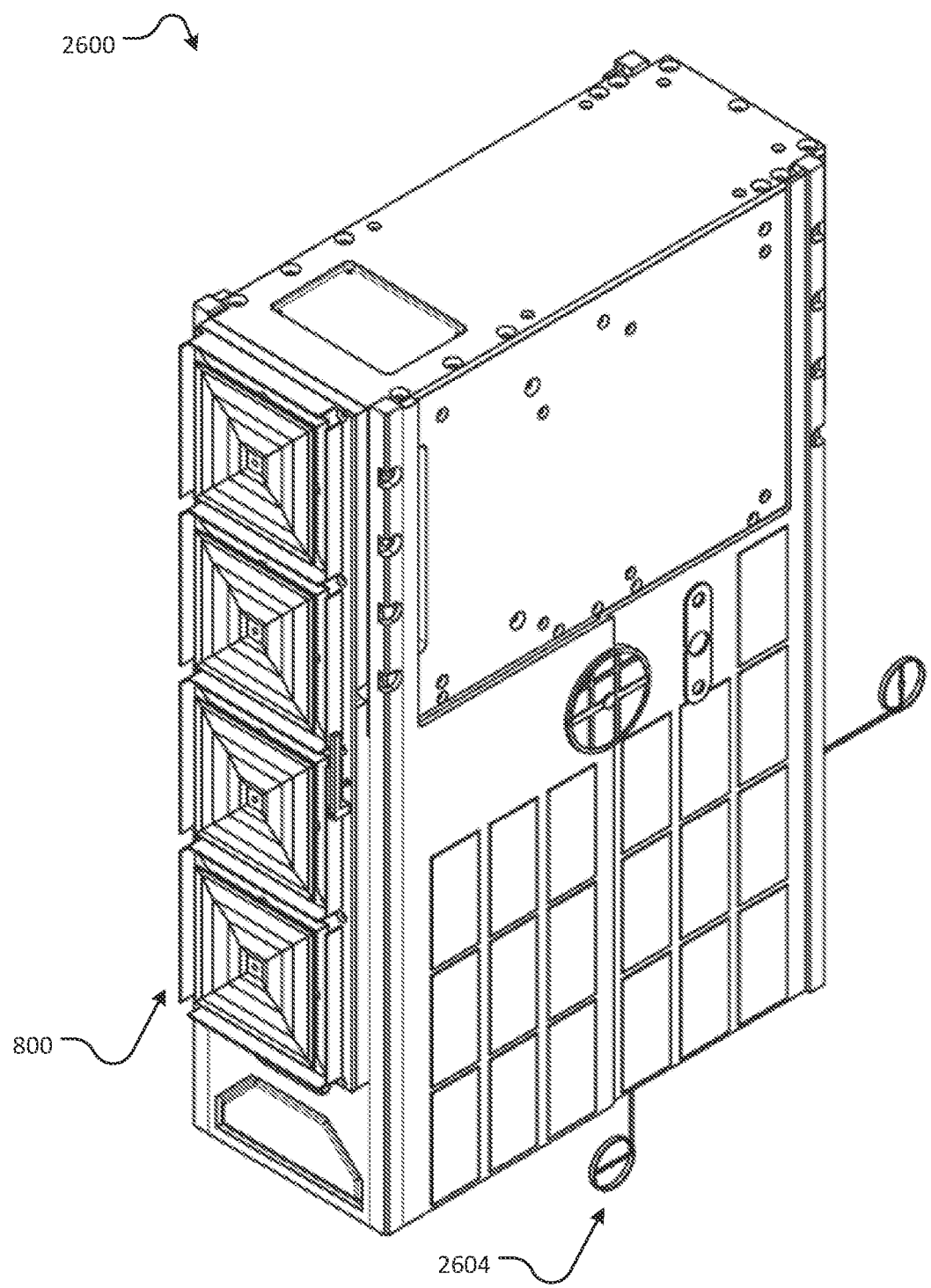
FIG. 26 is a perspective view of an example LEO satellite assembled with the antenna array according to some embodiments.

FIG. 26 is a plan view of an LEO satellite 2600 assembled with the antenna array 800 according to some embodiments. The LEO satellite 2600 is a 6U satellite.

Some embodiments relate to a method for forming an antenna patch body, including transmitting to a 3D printer a print model executable by the 3D printer to print the antenna patch body.

Some embodiments relate to a method of assembling an LEO satellite, including installing on an outer face of a chassis of the LEO satellite: an antenna array or multiple ones of the antenna according to the embodiments.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. An antenna, comprising:
   a base;
   a first antenna patch body; and
   a second antenna patch body disposed substantially parallel to and spaced from the first antenna patch body,
   wherein the first and second antenna patch bodies are aligned along a central axis and coupled to the base,
   wherein each of the first and second antenna patch bodies define surface corrugations, and
   wherein the first and second antenna patch bodies are integrally formed as part of a unitary body.

2. The antenna of claim 1, wherein the first antenna patch body and the second antenna patch body are held in spaced relation by a central post coupled to the base.

3. The antenna of claim 2, wherein the first and second antenna patch bodies are coupled to the base by the central post.

4. The antenna of claim 3, wherein the central post is integrally formed with one or both of the first and second antenna patch bodies.

5. The antenna of claim 1, wherein the antenna is formed in a stacked patch configuration.

6. The antenna of claim 1, wherein the base forms a substantially square cup surrounding the first and second antenna patch bodies other than an upper side, the cup including first, second, third and fourth side walls projecting from the base toward the upper side.

7. The antenna of claim 1, wherein the first antenna patch body is positioned closer to the base and has a larger lateral length than the second antenna patch body.

8. The antenna of claim 1, wherein the first and second antenna patch bodies include a central region without corrugations.

9. The antenna of claim 1, wherein the first antenna patch body has two probe coupling portions disposed at spaced locations toward an outer lateral edge of the first antenna body.

10. The antenna of claim 9, wherein the first and second antenna patch bodies have a substantially same thickness in areas outward of where the first and second antenna patch bodies couple to the base and other than at the two probe coupling portions.

11. The antenna of claim 1, wherein the surface corrugations are formed at a shallow angle.

12. The antenna of claim 1, wherein the surface corrugations of the first antenna patch body are aligned with the surface corrugations of the second antenna patch body so that separation of the first and second antenna patch bodies is substantially constant in a direction parallel to the central axis.

13. The antenna of claim 1, where the unitary body includes a central coupling portion aligned with the central axis.

14. The antenna of claim 1, wherein the unitary body is formed by 3D printing.

15. The antenna of claim 1, wherein the first and second antenna patch bodies are formed of aluminium or an aluminium alloy.

16. The antenna of claim 1, wherein the antenna has a lateral length and width of about 5 to 30 mm and a depth of about 1 to 5 mm.

17. A patch antenna array, comprising:
   multiple ones of the antenna of claim 1 positioned adjacently.

18. The patch antenna array of claim 17, wherein the multiple ones of the antenna are arranged to form a linear array.

19. The patch antenna array of claim 17, wherein spacing between the first antenna patch body of adjacent antennas is substantially uniform.

20. The patch antenna array of claim 17, wherein adjacent antennas share a cup wall.

21. The patch antenna array of claim 17, wherein the patch antenna array has a unitary base that acts as the base of each antenna.

22. The patch antenna array of claim 17, further comprising a tuning element mounted adjacent to the patch antenna array for allowing calibration of each antenna.

23. The patch antenna array of claim 17, wherein the base of each antenna defines first and second probe accommodation portions to receive respective first and second probes, the first and second probes being coupled to the first patch antenna body, wherein the first and second probe accommodation portions are spaced 90° apart relative to the central axis.

24. The patch antenna array of claim 17, wherein the base of each antenna defines first and second RF balancing portions on opposite sides of the base from respective first and second probe accommodation portions.

25. A method of making a LEO satellite, including installing on an outer face of a chassis of the LEO satellite: an antenna array according to claim 17.

26. The antenna of claim 1, wherein an air gap separates the first and second antenna patch bodies at locations radially outward of the central portion.

27. The antenna of claim 26, wherein the air gap separates the first and second antenna bodies by a substantially fixed distance in a direction parallel to the central axis.

28. A LEO satellite having mounted thereon: at least one antenna according to claim 1.

29. A method of making a LEO satellite, including installing on an outer face of a chassis of the LEO satellite: multiple ones of the antenna of claim 1.

30. The antenna patch body of claim 1, wherein at least one of the first and second antenna patch bodies have a substantially same thickness in areas outward of where the at least one of the first and second patch bodies couple to the base.

31. The antenna patch body of claim 1, wherein the first antenna patch body is configured as an excitation element to generate radiation, and/or the second antenna patch body is configured as a parasitic element to resonate radiation generated by the first antenna patch body.

32. An antenna patch body for a stacked patch antenna, the antenna body being integrally formed as a unitary body including a first antenna patch body, a second antenna patch body and a central portion joining the first antenna patch body to the second antenna patch body, wherein the first and second antenna patch bodies are substantially parallel with each other and spaced from each other.

33. The antenna patch body of claim 32, wherein the unitary body is formed by 3D printing.

34. The antenna patch body of claim 32, wherein the unitary body is formed of aluminium or an aluminium alloy.

35. The antenna patch body of claim 32, wherein the central portion defines a bore to allow coupling of the antenna patch body to an antenna base.

36. The antenna patch body of claim 32, wherein the central portion includes a converging wall portion that converges inwardly toward an axial middle location between the first and second antenna patch bodies, the converging wall portion being disposed on one side of the central portion.

37. The antenna patch body of claim 36, wherein the central portion has a rectangular cross-sectional profile through a middle of the converging wall portion.

38. The antenna patch body of claim 37, wherein the rectangular cross-sectional profile is angularly offset from a parallel cross-sectional profile of the first or second antenna patch body.

39. The antenna patch body of claim 37, wherein the central portion has a non-rectangular cross-sectional profile through a part of the converging wall portion that is spaced from the middle.

40. An antenna comprising:
a base; and
the antenna patch body of claim 32 coupled to the base via the central portion.

41. A method of making a LEO satellite, including installing on an outer face of a chassis of the LEO satellite: multiple ones of the antenna of claim 40.

42. A method for forming an antenna patch body, including transmitting to a 3D printer a print model executable by the 3D printer to print the antenna patch body of claim 32.

43. A stacked patch antenna, comprising:
a base;
a first antenna patch body;
a second antenna patch body disposed substantially parallel to and spaced from the first antenna patch body; and
first, second, third and fourth straight walls projecting from the base on respective four sides of the first and second antenna patch bodies;
wherein the first and second antenna patch bodies are aligned along a central axis and coupled to the base;
wherein the first and second antenna patch bodies have a rectangular profile when viewed in a direction of the central axis; and
wherein the first antenna patch body and the second antenna patch body are formed as part of a unitary body, wherein the unitary body includes a central portion joining the first antenna patch body to the second antenna patch body.

44. The antenna of claim 43, wherein the unitary body is formed by 3D printing.

45. The antenna of claim 43, wherein the unitary body is formed of aluminium or an aluminium alloy.

46. The antenna of claim 43, wherein the central portion defines a bore to allow coupling of the antenna patch body to the antenna base.

47. The antenna of claim 43, wherein the central portion includes a converging wall portion that converges inwardly toward an axial middle location between the first and second antenna patch bodies, the converging wall portion being disposed on one side of the central portion.

48. The antenna of claim 47, wherein the central portion has a rectangular cross-sectional profile through a middle of the converging wall portion.

49. The antenna of claim 48, wherein the rectangular cross-sectional profile is angularly offset or rotated from a parallel cross-sectional profile of the first or second antenna patch body.

50. The antenna of claim 48, wherein the central portion has a non-rectangular cross-sectional profile through a part of the converging wall portion that is spaced from the middle.

51. The antenna of claim 43, wherein each of the first and second antenna patch bodies defines surface corrugations.

52. The antenna of claim 43, wherein the first antenna patch body is positioned closer to the base and has a larger lateral length than the second antenna patch body.

53. The antenna of claim 43, wherein an air gap separates the first and second antenna patch bodies at locations radially outward of the central portion.

54. A LEO satellite having mounted thereon: at least one antenna according to claim 43.

55. A method of making a LEO satellite, including installing on an outer face of a chassis of the LEO satellite: multiple ones of the antenna of claim 43.

\* \* \* \* \*